(12) United States Patent
Lindy

(10) Patent No.: US 11,810,071 B2
(45) Date of Patent: Nov. 7, 2023

(54) PROPERTY MANAGEMENT SYSTEM AND RELATED METHODS

(71) Applicant: LINDY PROPERTY MANAGEMENT COMPANY, Jenkintown, PA (US)

(72) Inventor: Frank Lindy, Jenkintown, PA (US)

(*) Notice: Subject to any disclaimer, the term of this patent is extended or adjusted under 35 U.S.C. 154(b) by 709 days.

(21) Appl. No.: 17/013,425

(22) Filed: Sep. 4, 2020

(65) Prior Publication Data

US 2021/0056509 A1 Feb. 25, 2021

Related U.S. Application Data

(63) Continuation-in-part of application No. 16/453,542, filed on Jun. 26, 2019, now Pat. No. 11,200,629, and
(Continued)

(51) Int. Cl.
| | |
|---|---|
| *G06Q 10/20* | (2023.01) |
| *G06Q 50/16* | (2012.01) |
| *G06F 40/186* | (2020.01) |
| *G06Q 10/10* | (2023.01) |
| *H04N 7/18* | (2006.01) |

(Continued)

(52) U.S. Cl.
CPC ......... *G06Q 10/103* (2013.01); *G06F 3/0482* (2013.01); *G06F 9/451* (2018.02); *G06F 16/955* (2019.01); *G06F 40/186* (2020.01); *G06Q 10/06313* (2013.01); *G06Q 10/06316* (2013.01); *G06Q 10/1093* (2013.01); *G06Q 10/20* (2013.01); *G06Q 30/018* (2013.01); *G06Q 30/0283* (2013.01); *G06Q 30/04* (2013.01); *G06Q 30/0645* (2013.01);
(Continued)

(58) Field of Classification Search
None
See application file for complete search history.

(56) References Cited

U.S. PATENT DOCUMENTS

2005/0154657 A1 7/2005 Kim
2006/0129482 A1* 6/2006 Etzkorn ............... G06Q 20/10
705/39
(Continued)

OTHER PUBLICATIONS

"4 Steps to Create a Successful Online Property Management Company" [online], published on Oct. 23, 2015, available at: <https://www.propertyware.com/blog/4-steps-to-create-successful-online-property-management-company/> (Year: 2015).*

*Primary Examiner* — Richard W. Crandall
(74) *Attorney, Agent, or Firm* — Richard P. Gilly, Esquire; Archer & Greiner, P.C.

(57) ABSTRACT

A computerized system and method for management of leased real property comprises various modules which enhance system operations and the user interface for such system. One subsystem involves the production schedule for the residential units of multi-unit dwellings. The associated move-in/move-out subsystem determines a first set of the residential units comprising vacant units being turned over to become rent-ready, a second set of the residential units comprising units under renovation, and a third set of the units comprising rent-ready units. Additional modules or subsystems for the computerized system identify and improve workflows related to management of the multi-unit dwellings and residential units therein, such as virtual tour development, residential unit damage processing, and stale apartment rentals.

30 Claims, 27 Drawing Sheets

Related U.S. Application Data a continuation-in-part of application No. 16/034,095, filed on Jul. 12, 2018, now abandoned.

(51) Int. Cl.
| | |
|---|---|
| *G06Q 50/18* | (2012.01) |
| *G06Q 30/018* | (2023.01) |
| *G06Q 30/0645* | (2023.01) |
| *G06Q 10/0631* | (2023.01) |
| *G06Q 10/1093* | (2023.01) |
| *G06Q 40/12* | (2023.01) |
| *G06Q 30/04* | (2012.01) |
| *G06Q 30/0283* | (2023.01) |
| *G06F 9/451* | (2018.01) |
| *G06F 16/955* | (2019.01) |
| *G06F 3/0482* | (2013.01) |

(52) U.S. Cl.
CPC ........... *G06Q 40/12* (2013.12); *G06Q 50/163* (2013.01); *G06Q 50/18* (2013.01); *H04N 7/185* (2013.01)

(56) References Cited

U.S. PATENT DOCUMENTS

| | | | |
|---|---|---|---|
| 2006/0190279 A1* | 8/2006 | Heflin | G06Q 30/00 705/314 |
| 2012/0259876 A1 | 10/2012 | Mathai | |
| 2013/0332877 A1* | 12/2013 | Florance | G06F 16/9537 715/781 |
| 2014/0222697 A1* | 8/2014 | Maiani | G06Q 30/0282 705/313 |
| 2014/0289136 A1* | 9/2014 | Godbee | G06Q 50/16 705/306 |
| 2015/0235333 A1 | 8/2015 | Bangerter | |
| 2016/0265949 A1 | 9/2016 | Rotondo | |
| 2016/0294572 A1 | 10/2016 | Shadid | |
| 2017/0186299 A1 | 6/2017 | Lection | |

* cited by examiner

FIG. 5

*Click INSERT first to edit text in the notice.* 157

No further warnings will be given. Unless we hear from you within [number of days] with satisfactory results, we will commence legal action including the termination/non-renewal of your lease. 155

INSERT

*Click INSERT first to edit text in the notice.*

This letter serves as notice that should we receive any further complaints, we will be forced to take further action up to and including possible termination and/or non-renewal of your lease. We may also commence legal action in accordance with the violation. 155

INSERT

*Click INSERT first to edit text in the notice.*

The breakdown of these charges is as follows: 155

157

INSERT

Yours,

UPLOAD IMAGE    DELIVERY OPTIONS

FIG. 6

Ms. Smith
Unit 301
ABC Apts.

FROM: Jane Doe, Property Manager

RE: Invoice for Damage to Apartment Interior —— 161

Enclosed is an invoice for the Replacement of the broken window that was damaged in your apartment. Your responsibility to cover the cost of the damage incurred is set forth in "What Resident Agrees to - Repairs." It is important that you realize you are responsible for the action of. Per your Lease Contract, the amount of the invoice will be charged to your rental account. The charge totals $100 and must be paid within 30 days. The breakdown of these charges is as follows: This letter serves as notice that should we receive any further complaints, we will be forced to take further action up to and including possible termination and/or non-renewal of your lease. We may also commence legal action in accordance with the violation.+

If you have any questions please feel free to contact the Management Office at 555-555-5555. Thank you for your cooperation.

[ SEE ATTACHED IMAGES ]  [ EDIT DELIVERY OPTION ]  [ EDIT TEXT ]  [ PRINT ]

- ⓘ Floor Level 1
  $20
- ⓘ Floor Level 2
  $0.01
- ⓘ Furnished Apartment
  $1500
- ⓘ Galley Kitchen
  $185
- ⓘ Lindy Kitchen
  $250
- ⓘ MOD
  $150
- ⓘ Plank Flooring
  $50
- ⓘ Plank Floors
  $50
- ⓘ Quartz Countertops
  $50
- ⓘ Smoke Free Building
  $30
- ⓘ SUP
  $100
- ⓘ Top Floor
  $0.01
- ⓘ Updated Appliance Package

Move Out Inventory & Condition Form

| Inspection Date | Technician | Property | Units |
|---|---|---|---|
| 07-07-2020 | John Doe | Gateway Towers | A423 |

| | |
|---|---|
| Resident Name | John Doe |
| Forwarding Mailing Address | johndoe@gmail.com |
| Date Resident Turned in Keys | Jul-06-2020 |

| Damage Summary | | | | |
|---|---|---|---|---|
| Main Category | Sub Category | Charges Type | Note | Charges |
| CARPET | Shampoo 1 Bedroom | Replace | Need to replace carpet | $213.00 |
| Additional Damage Charges | | | | |
| Missing one unit key | | | | $50.00 |
| | | | Total Charges | $263.00 |

| LIVING ROOM: | |
|---|---|
| Walls/ Outlets: | Ok |
| Ceilings / Lights: | Ok |
| Window: | Ok |
| Door / Closet: | Ok |
| Window coverings: | Ok |
| Other: | Ok |
| DINING ROOM: | |
| CARPET: | |
| Shampoo 1 Bedroom: | Not Ok |
| Charges Type | Replace |
| Charges | |
| Comment | Need carpet replaced in bedroom |

Fig. 19A

| | |
|---|---|
| 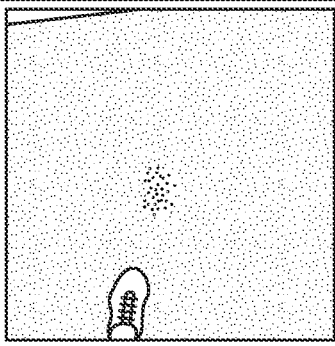 1911 | |
| Shampoo 2 Bedroom: | Ok |
| Stain Removal: | Ok |
| Burns: | Ok |
| Deodorize: | Ok |
| Pet Treatment (Odor): | Ok |
| Replace Carpet 1 Bedroom: | Ok |
| Replace Carpet 2 Bedroom: | Ok |
| MISCELLANEOUS: | |
| Remove Debris (Per Bag): | Ok |
| Removal Of Bulk Items: | Ok |
| Clear Storage Locker: | Ok |
| OVERALL: | |
| Signs of Moisture outside the apartment: | Ok |
| Signs of Moisture inside the apartment: | Ok |
| Resident | John Doe — 1915 |
| Lindy Community Representative Name | John Doe |
|  1913 | |
| Technician | John Doe |
| Resident not available for signature | YES — 1917 |
| Resident refused Signature | NO — 1919 |

Fig. 19B

| Last 6 Months ▼ | | | | | | | |
|---|---|---|---|---|---|---|---|
| PROPERTY | JUNE | | | | MAY | | |
| | TOTAL UNITS TURN TO RENT READY | AVG DAYS FROM TURN TO RENT READY | TOTAL UNITS RENO TO RENT READY | AVG DAYS FROM RENO TO RENT READY | TOTAL UNITS TURN TO RENT READY | AVG DAYS FROM TURN TO RENT READY | TOTAL UNITS RENO TO RENT READY | AVG DAYS FROM RENO TO RENT READY |
| Warrington Crossings | 1 | 9 | 0 | 0 | | | | |
| Parks at Westminster | | | | | | | | |
| Towers at Wyncote | 46 | 23 | 0 | 0 | 1 | 36 | 0 | 0 |
| 7400 Roosevelt | 1 | 21 | 0 | 0 | 33 | 14 | 0 | 0 |
| Meadowbrook | 4 | 10 | 0 | 0 | | | | |
| Joshua House | 1 | 40 | 0 | 0 | 1 | 8 | 0 | 0 |
| Crossings at Stanbridge | | | | | | | | |
| Enclaves | 1 | 24 | 0 | 0 | | | | |
| Gateway Towers | 2 | 26 | 0 | 0 | | | | |
| Mt. Airy Arms | | | | | | | | |
| Haverford Court | | | | | 1 | 21 | 0 | 0 |
| Bromley House | | | | | | | | |
| Fountain Gardens | | | | | | | | |
| Eola | 1 | 26 | 0 | 0 | | | | |
| Regency House | 1 | 28 | 0 | 0 | | | | |
| 201-207 Leedom St. | | | | | | | | |
| Total & Overall Average | 60 | 23.00 | 0.00 | | 36 | 19.75 | | 0.00 |

Fig. 21

| BUILDING | UNIT | DATE TAKEN | TAKEN BY | VIDEO LINK |
|---|---|---|---|---|
| Bromley House | C209 | 06-11-2020 | Jane Doe | View Video |
| Bromley House | A217 | 06-11-2020 | Jane Doe | View Video |
| Crossings at Stanbridge | 314 | 06-01-2020 | Jane Doe | View Video |
| Enclaves | 3964B2 | 06-02-2020 | John Doe | View Video |
| Enclaves | 3932C1 | 06-02-2020 | John Doe | View Video |
| Enclaves | 3928C2 | 06-02-2020 | John Doe | View Video |
| Gateway Towers | B517 | 06-02-2020 | John Doe | View Video |
| Gateway Towers | B308 | 06-02-2020 | John Doe | View Video |
| Gateway Towers | B324 | 06-02-2020 | John Doe | View Video |
| Gateway Towers | C106 | 06-02-2020 | John Doe | View Video |
| Mt. Airy Arms | 3078 | 06-01-2020 | Jane Doe | View Video |
| Regency House | 411 | 06-11-2020 | Jane Doe | View Video |
| Meadowbrook | 421 | 06-08-2020 | John Doe | View Video |
| Meadowbrook | 419 | 06-08-2020 | John Doe | View Video |
| Sedgwick Gardens | C319 | 06-01-2020 | Jane Doe | View Video |
| Towers at Wyncote | 1009-2 | 06-08-2020 | Jane Doe | View Video |
| Towers at Wyncote | 1102-2 | 06-08-2020 | Jane Doe | View Video |
| Towers at Wyncote | 0527-1 | 06-12-2020 | Jane Doe | View Video |
| Towers at Wyncote | 1112-1 | 06-12-2020 | Jane Doe | View Video |
| Towers at Wyncote | 0922-2 | 06-07-2020 | Jane Doe | View Video |

Fig. 26

PROPERTY MANAGEMENT SYSTEM AND RELATED METHODS

CROSS-REFERENCE TO RELATED APPLICATIONS

This application is a continuation-in-part of U.S. patent application Ser. No. 16/453,542, filed Jun. 26, 2019, currently pending, which is a continuation-in-part of U.S. patent application Ser. No. 16/034,095, filed Jul. 12, 2018, currently pending, the entire contents of both of the foregoing being hereby incorporated by reference.

FIELD

This disclosure relates generally to systems and methods for the management of real properties, especially for the management of multiple leased properties, both residential and commercial.

BACKGROUND

Property management systems of the prior art suffer from various drawbacks and disadvantages. For example, computer based systems may not include or may not sufficiently integrate all functions associated with management of one or a panoply of real properties, may not include analytics or statistics desirable to property owners and managers, or may not be flexible enough to accommodate the full range of management situations and associated workflows. As a result, property managers' performance of their duties using prior art systems may be suboptimal or otherwise unnecessarily time-consuming, and may likewise adversely affect the tenant experience at their rented unit, or efficient operations of the one or more properties under such prior art systems.

For example, it may be time consuming to customize warning notices to residents of apartment buildings. Each notice may require multiple customizations to fit the severity and timing and other circumstances. Because of the many customizations often necessary to complete a simple resident notice, it may be difficult for property management companies to maintain a consistent "voice" or tone in its resident notices.

Additionally, the notice may need to disclose the time or manner in which management learned of the violation and may need to reference a prior notice and the date of such notice. Another time consuming aspect of this task is that examples of standardized text may be scattered and the able manager needs to locate and keep them handy for reference. Finally, in an apartment community it is often desirable to have a steady "voice" in management's warning notices, regardless of which property manager may be issuing them. A further problem is that customized resident notices, when finished, may simply reside on the manager's computer and not be automatically saved to a central repository.

In addition to the need to generate notices to tenants efficiently and accurately, apartment house managers generally have numerous forms to send to tenants related to their maintenance and occupancy, a process which can be a logistical challenge.

Still further, issues may arise concerning the moving in of new tenants and the moving out of old tenants, such as keeping track of security deposits, making apartment repairs, and scheduling maintenance and other actions to allow rental to a new tenant after an old tenant has vacated the leased apartment or townhouse.

Another challenge to property management is having a complete and accurate picture of which of the various possible amenities are present or absent in which dwelling unit or multi-unit dwelling, so that rental prices of such units accurately reflect such amenities, or for other scheduling or management purposes.

It is likewise a challenge to efficiently produce promotional collateral, such as pictures or videos, of individual apartment units in multi-unit dwellings, given the sheer volume of units to be promoted, especially in the event of large or multiple multi-unit dwellings. A similar challenge involves making the turnaround time between vacancy of a unit and re-rental of such unit as short as possible.

As an additional challenge, it is important for property managers to receive exception reports for uncaptured potential revenue rental, delays in turnaround, and other property management inefficiencies, and to be able to assess such exceptions across MUDs or compare one MUD to another using data, benchmarks, and the like.

In view of the foregoing, it would be advantageous to address these and other drawbacks and disadvantages of the prior art with an improved system and related methods for property management.

SUMMARY

The instant disclosure describes an improved property management system and method in which inter-related modules or subsystems (such terms used interchangeably herein) integrate a wide variety of property management functions and data, thereby improving computer system operation itself, as well as end-user operations. The subsystems are inter-related and inter-operable so as to provide flexibility to the user in performing property management functions, while at the same time standardizing such operations and making sure that all components of the property management operations have been accounted for or addressed, as detailed in this disclosure.

In one implementation, a computer-implemented system manages multiple, real properties comprising multi-unit dwellings or MUDs. (The term "multi-unit dwelling" or "MUD" shall include apartment buildings, houses, townhouse or townhome communities, and other multi-resident living communities under common management.) The system makes available through a user interface, such as a graphical user interface, multiple, respective, property management functions associated with electronic files and records of the units and tenants of the multiple buildings under management.

In one possible implementation, the system has been programmed so as to be capable of receiving user input to access or launch various property management subsystems, such as a residential notice subsystem, a certificates subsystem, a licenses subsystem, a contracts subsystem, a move-in/move-out subsystem, a statistics subsystem, and a resident assistance subsystem.

In certain possible operations, the disclosed system displays a series of screens corresponding to a selected property management function in a programmed order, in this way establishing a corresponding work flow for the user. For example, the system may display one screen of the series of screens and require user input therein, restricting display of a second or subsequent screens until after such input has been received.

In other variations, the system may comprise a residential notice subsystem which executes computer instructions to simplify and automate the generation of notices to residents of leased premises in the rental units. One possible operation of the residential notice subsystem involves retrieving, in response to user input, a template corresponding to one of the resident notices to be generated; displaying various notice components associated with the retrieved notice template; and during display of the retrieved notice template, displaying one or more user-selectable fields. The system may then display at least one user-selectable subfield after the user has selected the field. Multiple subfields may have different, respective text blocks associated with them. In this way, then, the user generates a residential notice by selecting fields and subfields by activating computer programming to insert the corresponding text block or blocks into the selected template. This both customizes the notice for certain aspects, but also standardizes many aspects of it so that it is consistent across multiple users for the circumstances.

The system programming associated with the resident notice subsystem may also include programming to display a warning-type menu, so that the resident notice to be generated includes text blocks or other indicia corresponding to a first notice, a second notice, a final notice, or a termination.

During the notice generation work flow, the system may be operated to generate resident notices by displaying notice components in the form of (1) standard text unalterable by the user; (2) populated text displayed in predetermined zones of a corresponding notice template; and (3) user-selectable fields of the template.

Another aspect of the property management system may include a move-in/move-out subsystem, which displays a move-in/move-out template after user-selection of a selected one of the units associated with a move-in or a move-out. In either case, a series of condition report fields are generated and displayed by this system as part of the move-in/move-out template, the condition report fields corresponding to amenities of the rental unit. The system is programmed to receive inputs by means of the condition report fields and is programmed to determine a value of an amenity score after receiving inputs into the condition report fields. Thereafter, the system compares the determined amenity score to a previously determined amenity score and, depending on meeting or exceeding threshold conditions, may positively or negatively adjust the unit rental price for the unit based on the change in the amenity score.

In one possible implementation, an amenities inspection engine may be part of the property management system. Though not required, such amenities inspection engine may be accessed during a move-out inspection, and thus be considered part of the move-in/move-out subsystem. The amenities inspection engine has front-end and back-end modules. The front-end module receives user data inputs related to amenities of one or more units associated with the one or more multi-unit dwellings associated with the property management system of this implementation. The back-end module processes the data inputs to accomplish various property management calculations, metrics, and related management functions.

The amenities inspection engine accesses an amenities database which, in turn, has a plurality of amenity identifiers and amenity values associated with such amenity identifiers. Thus, for example, amenity identifiers may be a label and corresponding field or other flag corresponding to a type of amenity found in one or more of the dwelling units, and the associated amenity values may be dollar values associated with such amenity and its corresponding amenity identifier.

In one possible implementation, the front-end module of the move-in/move-out subsystem includes programming capable of performing any of the following steps, in any suitable order, for a selected one of the units, such processing steps capable of being performed in response to suitable user input or other computer executed commands. Thus, for example, programming of the front-end module may be capable of performing the display of either existing amenities indicia or missing amenities indicia or both, such indicia corresponding to associated amenity identifiers and amenity values stored in the amenities database. The front-end may likewise, in response to user selection of a field for adding amenities, display a user-selectable list of amenities which are available to add to the property data record of the dwelling unit under consideration. Upon display of a user-selectable list of available amenities, the front-end may receive user input corresponding to one or more selections from such list. The one or more selections result in generating an added amenities listing, as a result of suitable programing of the front-end.

A user may access the front-end to associate digital images with the one or more selections comprising the added amenities listing. In one possible implementation, the front-end comprises a smart-phone app and the digital images are added by means of the camera associated with such smart-phone, and photos may be associated with the added amenities listing by virtue of a photo capture field.

In the disclosed implementation, the back-end module includes programming capable of performing various analytical or processing steps after receiving user input corresponding to the amenities at the front-end as described above. Thus, for example, the back-end may be suitably programmed to determine an additive amenity value corresponding to the added amenities listing generated by inputs at the front-end of the amenities inspection engine. In addition, the back-end module may likewise generate an adjusted unit rental price for the dwelling unit selected for inspection, such adjusted unit rental price being a function of added or deleted amenities and the associated amenity values. The back-end, upon receiving suitable inputs, either by upload or other data transfer, may in turn update the property data record to include the adjusted unit rental price determined from the added or deleted amenities.

The back-end module may likewise be programmed so as to be capable of sorting and displaying digital images associated with amenity identifiers, selected units, and selected multi-unit dwellings. Furthermore, user-selectable reports of amenities, including digital images, values, identifiers, or other suitable indicia associated with amenities, may be generated by suitable programming for any one of the multi-unit dwellings that comprise part of the property management system property data records.

For example, the user-selectable report of amenities can be in the form of a move-out report. The generation of such move-out report is accomplished by the system herein by means of accessing a plurality of move-in/move-out identifiers in the relational database. The identifiers include a building identifier, an occupancy status identifier, and a unit identifier. The system is operable to enable the occupancy status identifier to be updated to indicate a move-out condition, in which case the system is further operable such that a selected one of the units with such status may be the subject of user-selection and user-input to create a move-out report. The system includes programming operable to associate digital images of the amenities of the selected unit with the move-out report and the system permits updating of the corresponding property data record for the selected unit to include not only the move-out report, but also the associated digital images.

Further programming and related system operations include executable instructions for calculating damages to the amenities of the selected unit during a move-out inspection associated with the generation of the move-out report. The damages for a given amenity may either be pre-loaded into the relational database such that they are automatically merged into the associated move-out report, or the amount of damage may be selected from a menu according to the severity of the damage, or the amount of damage may be manually inputted by the inspector during operation of the front-end of the move-in/move-out subsystem. The damage calculation may be displayable either electronically or programming may be provided for generating a displayable and printable form, including indicia corresponding to the damages.

In one aspect of generating the move-out report, in the event there are damage calculations performed by the move-in/move-out system, an electronic notification corresponding to the inspected unit may be generated and electronically transmitted by the system to the community manager (that is, the manager of the property or of the associated multi-unit dwelling(s) on such property). The electronic notification may include the move-out report in electronic form or other indicia summarizing or setting forth the damage to such selected unit and the corresponding damages calculation. The system may include suitable programming such that communications and the management of damages to units are more efficiently handled. For example, the electronic notification generated by the system may include a user-selectable link to programming, which link enables the community manager or other user to provide input to the system. Such input, when received, may alter, confirm, or otherwise comment upon or relate to the damages assessment of the inspected unit inputted by staff and which was the subject of the move-out report.

The system may further include programming which tracks time elapsed from the generation of the electronic notification to the community manager mentioned above for the selected unit. In response to a lapse of a predetermined time period, such as upon the passage of 72 hours or three days, the programming may generate and transmit a second electronic notification, this notification going to an accounting function and including the amenity charges associated with the damages. Before the passage of the predetermined time period, a community manager, regional manager, or other management personnel may request system access to the move-out report or the associated property data record, and the system may selectively receive manager input overriding or changing damages assessment. In this way, the property management system institutes a workflow involving a management review period for damages assessed at inspection, before the corresponding damage charges are provided to the accounting function.

In still other implementations, the operations of the property management system are further optimized by including programming capable of displaying user-input fields in an ordered sequence which corresponds to a promotional collateral workflow. The programming, when executed, is capable of performing the steps of receiving from the user, for a selected residential unit, certain promotional collateral in the form of a digital video file, an opening card data file, and a closing card data file, the data collectively comprising a visual tour of the selected unit. The programming allows uploading of the data corresponding to the visual tour to the database and associating the visual tour data with the property data record of the selected unit. The programming further optimizes the operation of the property management system by generating and displaying a user-selectable field for the visual tour data on a display screen simultaneously with the display of user-selectable fields categorizing multiple units of the multi-unit dwellings by their work-in-production status (vacant, under renovation, rent-ready, rented, etc.).

In certain implementations of the property management system, its operations are optimized by programming capable of displaying indicia in the form of a dashboard, the dashboard further including a production schedule. The production schedule is displayed by programming such that there are user-selectable production schedule fields, the production schedule having associated programming for selectively determining, for multiple units of at least one of the multi-unit dwellings, a first set of the residential units which may comprise vacant units in the process of being turned over to become rent-ready units. A second set of the residential units may likewise be generated by suitable programming of the system and such second set of residential units comprises units under renovation; whereas, a third set of the units may be determined by system programming and such third set comprises the rent-ready units.

One salient aspect of the computer programming associated with the production schedule is programming which is operable to process the foregoing sets of residential units as a function of time or delay periods, such as a period of days elapsed between a move-out date associated with vacant residential units and a subsequent date. The subsequent date, for example, may be either the current date of operation of the system, the date that a renovation associated with the unit was completed, or the rent-ready date. To facilitate ease of operation of the property management system, certain programming displays user-selectable indicia related to the production schedule simultaneously on the dashboard. Such simultaneous display of indicia may comprise a first user-selectable field corresponding to production statistics and an additional set of user-selectable fields, the additional set of user-selectable fields corresponding to the vacant units, the units under renovation, and the rent-ready units.

The system may be operated in an improved manner by virtue of programming associated with the production schedule for determining the following production statistics of benefit to property management: for a time period, such as a month, a total-unit turnover number corresponding to the number of units of the multi-unit dwelling turned over from vacant to rent-ready, an average number of days associated with the total-unit turnover number, a total-unit renovation number corresponding to the number of units renovated to become rent-ready, and an average number of days associated with the total-unit renovation number. The programming may likewise determine the foregoing production statistics for multiple time periods, such as multiple, respective, calendar months. The system may be more efficiently used if the plurality of time periods and the production statistics associated with such time periods are displayed by suitable programming on a single, user-perceptible screen with user-selectable unit-total fields. As such, the unit-total fields correspond to the total-unit turnover number and the total-unit renovation number for the corresponding time periods.

The programming associated with the production schedule assists users in identifying excessive delay amounts in production by determining residential units with delay values exceeding one or more predetermined delay amounts. So, for example, in terms of units being turned over to rent-ready, a determination of which units remain unready for greater than seven days and which units remain unready for greater than fourteen days may be done by the programming, and suitable indicia for both of these exceptional turnover delays may be displayed simultaneously on the dashboard, and in a manner to highlight such exceptions to preferred turnaround times. The display may be in the form of user-selectable fields, so that those units determined by the programming to exceed the predetermined delay amounts are accessible by user-selection.

The programming of the system, including the programming associated with the production schedule, may be in a suitable network cloud or associated cloud service, in one or more central or remote servers, at distributed nodes, in user devices, or combinations of the foregoing or any similar suitable computer architecture. In one suitable version, the system comprises a front-end with suitable programming for uploading data to update the property records of an operatively connected relational database. The front-end may comprise modules selectable by a personal electronic device, such as a smartphone, and the modules selectable via such personal electronic device may include a move-out module, a make-ready module, an amenities walkthrough module, a visual tour module, a smartboard access module, a credit-card mileage module, and a snow log module.

The front-end may likewise access a stale inventory module, an incident module, an audit module, and a preventative maintenance module.

Still further versions of the property management system allow for searching of the relational database and its associated property data records to determine user activities and updates during a selected period of time. The determinations may be sortable by the type of user update, the identity of the user who performed the update, and the nature of the update, such as a move-out inspection, a make-ready inspection, or the creation of a visual tour. The programming may generate and display corresponding activity log indicia sortable by associated activity fields, such as the user, date, residential unit, multi-unit dwelling, or the nature of the user update.

The back-end may receive multiple amenity inspection records identifying a corresponding date, time, and inspector, such records associated with the updating of the property data record with added amenities or associated with the adjusted unit rental price. The user-selectable reports of amenities generated by the back-end may likewise tabulate in a spreadsheet or other suitable smartboard or dashboard a listing of amenities added or subtracted, and may likewise display reports showing adjusted unit rental price and associated amenities, including digital images thereof and associated amenity values.

Various tabulations and totals of amenity values and corresponding unit rental prices may be determined by suitable processing by the back-end and likewise the total number of amenity inspection records may be tabulated and sorted by multi-unit dwelling or other suitable metric so as to facilitate property management functions. For example, knowledge of how many units in a given multi-unit dwelling have a given amenity already existing, as opposed to needing such amenity to be installed, may be used for planning purposes in upgrading some or all of the units lacking such given amenity in the associated multi-unit dwelling. These and other budgeting, property upgrade management, repair, construction, and other renovations may be facilitated by suitable programming which sorts the amenity identifiers and associated values stored in property data records of the foregoing system. The foregoing features and functions of both the front-end and the back-end are facilitated by programming which displays output associated with the forms of any of the foregoing processing steps, such output, for example, being displayed on a user-viewable screen. The display may likewise be in the form of a spreadsheet with user-selectable fields or other user-selectable form.

The improved property management system of this disclosure may be operated in any number of ways and is thereby associated with various related methods. Other subsystems of the system may be operated to perform other property management functions. The system makes resident assistance available to tenants with medical conditions, disabilities or other special needs. Forms may be generated and sent electronically to residents for completion and return, including links as needed. Such a form builder subsystem may likewise monitor sending date of the form and track its return. The system may not only store the panoply of certificates, licenses, and contracts associated with property management, but enable tracking by expiration date, sorting and filtering, and communicate with inspection or other responsible personnel, using suitable database access and sorting programming or subroutines. Statistics may be generated by a corresponding subsystem, accessing property data stored in or accessible to the system, so as to monitor property management compliance, occupancy, pricing, and other parameters of interest to management.

BRIEF DESCRIPTION OF THE DRAWINGS

FIGS. 4-7 are displayed pages of a graphical user interface of the disclosed system associated with generating a resident notice;

FIG. 11 is another screenshot of the amenities inspection engine of FIG. 10;

FIG. 12 is another screenshot of the programming associated with the amenities inspection engine of FIGS. 10-11;

FIG. 13 is yet another screenshot generated by suitable programming of the amenities inspection engine of FIGS. 10-12;

FIGS. 19A and 19B are screenshots of a displayable and printable move-out report generated by suitable programming of the move-in/move-out subsystem;

FIG. 21 is a screen shot of production statistics displayable from programming associated with the production schedule disclosed herein;

FIG. 26 is a screen shot generated by suitable programming associated with the production schedule for accessing visual tour digital video files.

DETAILED DESCRIPTION

Figure 1:
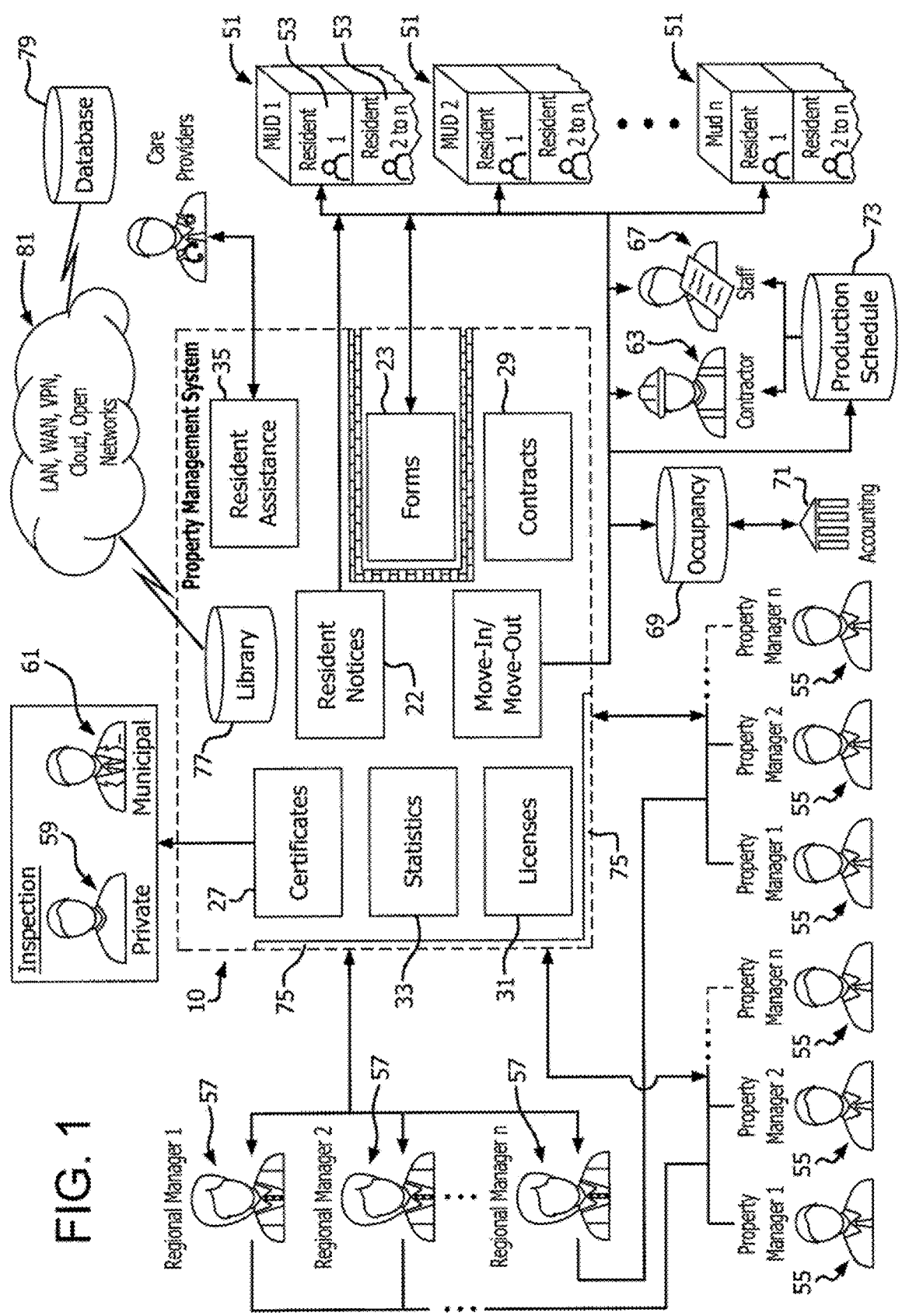
FIG. 1 is a schematic diagram of the system according to one possible implementation of the present disclosure.

FIG. 1 is a schematic diagram of one possible implementation of the improved system 10, showing subsystems 25 associated with property management functions, including a move-in/move-out module subsystem 21, a notice subsystem 22, a form builder subsystem 23, a certificates subsystem 27, a contracts subsystem 29, a licenses subsystem 31, a statistics subsystem 33, and a resident assistance subsystem 35.

FIG. 1 shows property management system 10 in relation to a variety of potential users of such systems and recipients of output from system 10, as well as the associated information, data or communication flows. In the illustrated implementation, system 10 is for managing multiple real properties comprising a plurality of multi-unit dwellings ("MUDs") 51 (whether apartment buildings, houses, townhomes, or other structures), each multi-unit dwelling having multiple residents or tenants 53 residing in rental units therein (whether apartments, floors, or homes).

The multi-unit dwellings 51 are generally managed by one or more corresponding property managers 55, who may report to regional managers 57, both of whom provide input to, and receive output from, property management system 10 in performing the various property management functions associated with subsystems 25. Additional users or personnel associated with property management system 10 may involve inspection personnel related to various certificates and other compliance aspects of MUDs 51, such as non-governmental inspectors 59 and municipal inspectors 61. Furthermore, in the case of certain of residents 53, such as elderly, disabled, and those with other special needs, property management system 10 may interact with care providers 63, especially in the context of the resident assistance subsystem 35 described hereinafter. Still further, contractors 65 and maintenance staff 67 may receive repair, replace, or other work or maintenance orders, and the like, as outputs from property management system 10, such as through move-in/move-out subsystem 21, as shown by the various connecting lines and arrows of FIG. 1.

In still further aspects, property management system 10 may access any number of databases, either located behind a firewall associated with property management system 10 or remote therefrom, such databases including an occupancy database 69, which may tally occupancy rates and related financial statistics, and in turn communicate certain financial data to an accounting function 71. Contractor 65 and maintenance staff 67 may, in certain implementations, selectively access and update a production schedule stored in a corresponding database 73.

Property management system 10 includes suitable processing capability, such a central processing unit, and suitable programming stored in a computer readable medium and comprising executable instructions capable of performing various functions and steps associated with property management subsystems 25. One or more user interfaces, whether aural/voice-based, or graphical, is shown schematically at 75 in FIG. 1. In the case of a graphical user interface, one or more associated user-viewable screens are associated therewith, for interacting with the personnel described above, especially property managers 55 and regional managers 57, who are generally supplying user input (through any suitable input device) for the associated property managing functions.

System 10 includes a library 77 which stores electronic files in a variety of forms and formats, as appropriate for operation of the subsystems 25 described herein. In general terms, electronic files include property data with records corresponding to a plurality of multi-unit dwellings 51, as well as the units and residents' names corresponding to respective rental units. The electronic files likewise include a variety of templates and records generated from such templates for corresponding subsystems, as detailed herein.

Library 77 may communicate selectively with databases, such as drop boxes, remote storage, and other storage medium, the foregoing shown schematically at 79. One or more functions of property management system 10 may be implemented by means of LAN, VPN, internet, cloud, or other distributed communication and transmission networks, as shown schematically by reference 81.

System Overview

Figure 2:
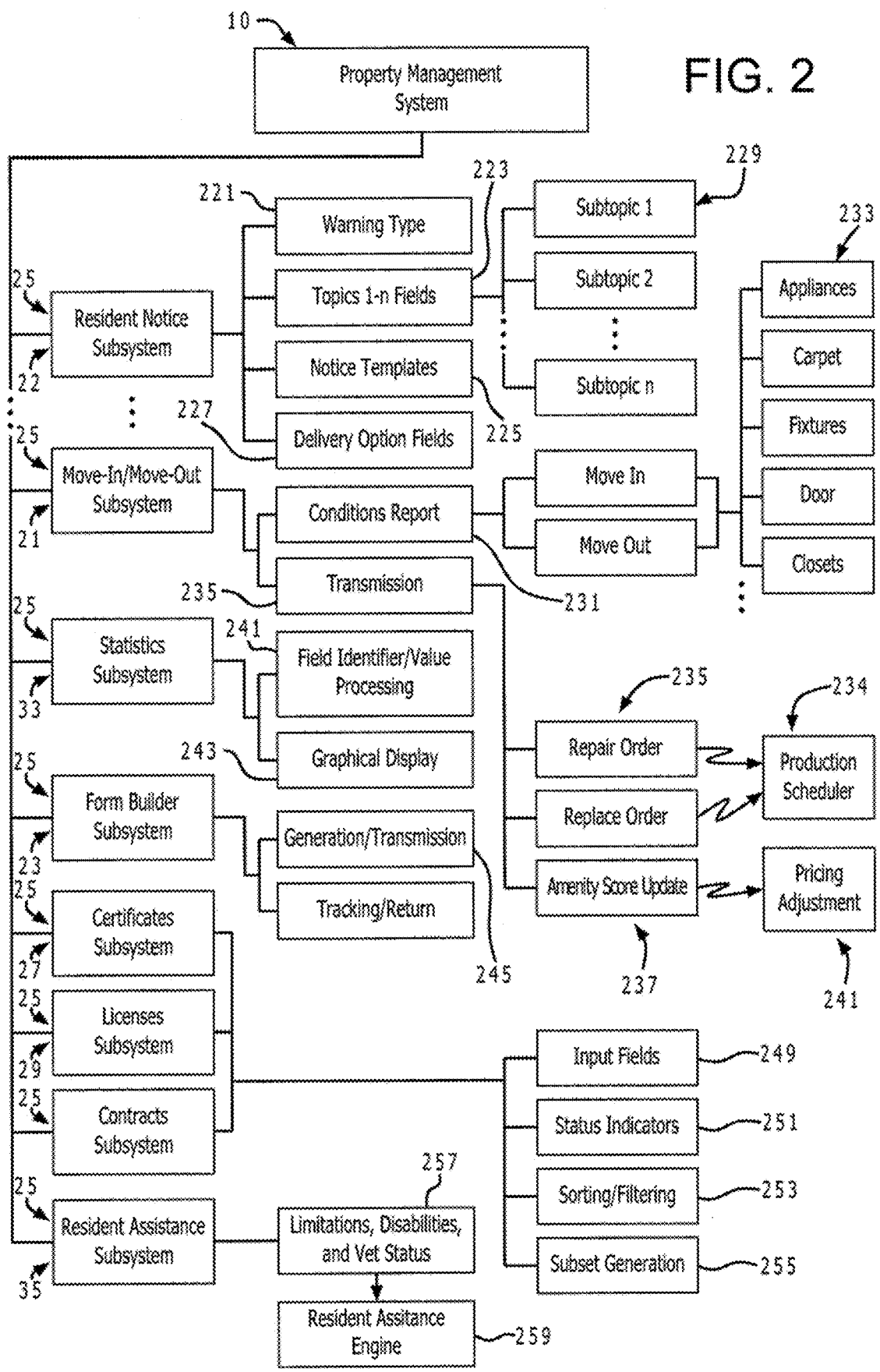
FIG. 2 is a program structure schematic of the system of FIG. 1.
Figure 3:
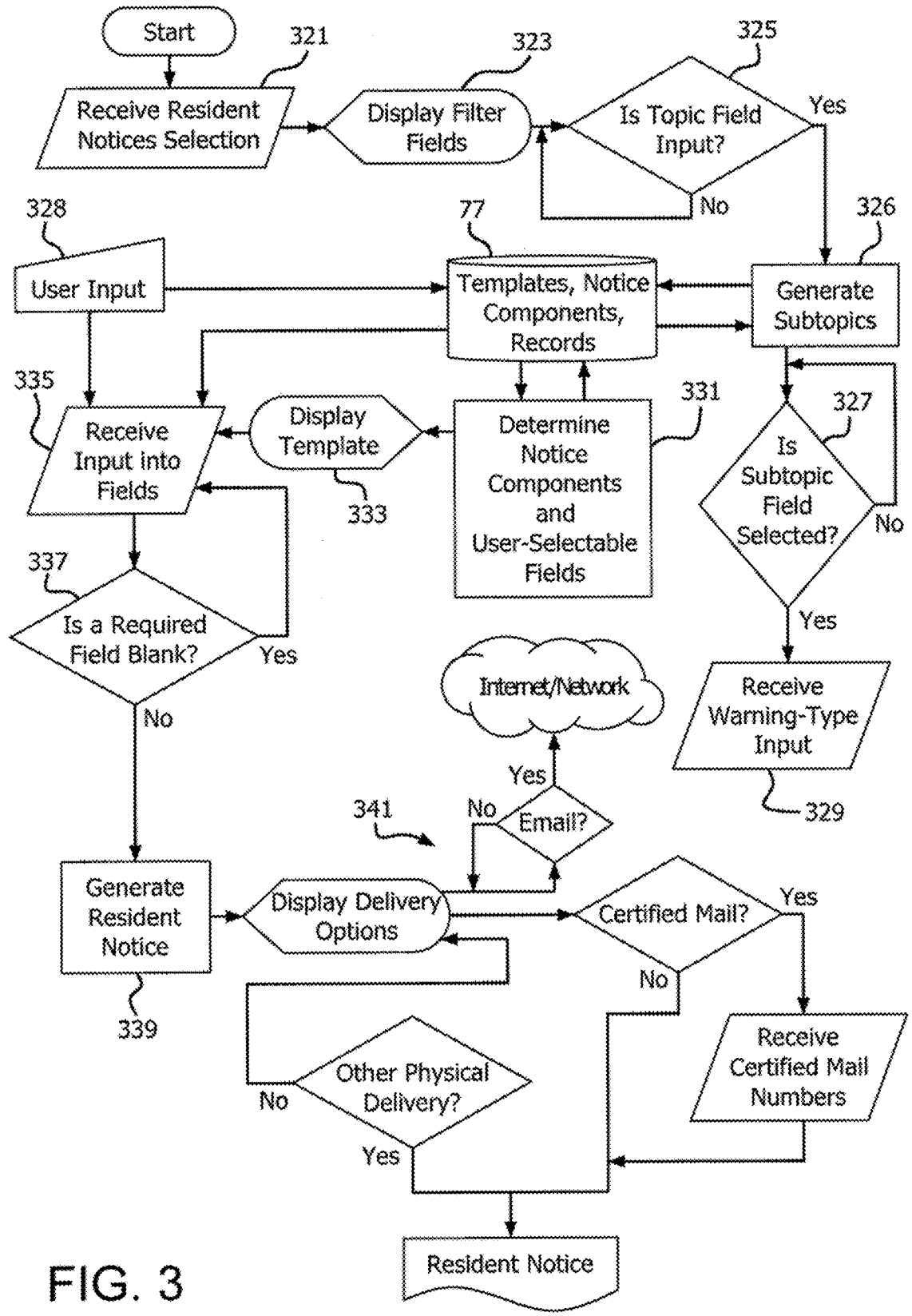
FIG. 3 is a flow chart of one possible implementation of a resident notice engine or subsystem of the current disclosure.

FIG. 2 shows a general function schematic block diagram of property management system 10 and its various subsystems 25, with suitable programming being associated with blocks to perform the functions associated therewith, the executable instructions, programming, or subroutines for performing such functions identified by reference numerals herein and shown in FIG. 2.

In particular, with regard to resident notice subsystem 22, suitable programming prompts the user, such as a property manager, to input a warning type (221), such warning type associated with a new resident notice being generated, such as first warning, second warning, final warning, and termination. Suitable programming likewise enables user input into topics for which the notice relates (223), and depending on topics selected (as well as subtopics discussed hereinafter), an associated one of the notice templates is generated and displayed (229) for further input and processing. Once a suitable topic has been selected or received by resident notice subsystem 22, follow-on programming generates a menu of user-selectable fields for input or selection of multiple subtopics relating to the selected topic (229). Upon generation of the resident notice, subsystem 22 enables input into various fields to specify how the notice shall be delivered (227), such as hand delivery, under door delivery, certified mail, and the like.

With regard to statistics subsystem 33, a stats reporting opening page is displayed by suitable programming and includes multiple statistics filter fields for sorting data in a database for generation of associated statistics. Suitable sorting can be performed by the type of document for which statistics are desired, such as building contracts, certificates, licenses, occupancy rate, and the like, those statistics can encompass all buildings, a selected building, or combinations thereof, and the types of contracts, certificates, or other documents being searched may likewise be specified by suitable input into corresponding statistics filter fields appearing on the graphical user interface.

In response to suitable user input, statistics subsystem 33 processes associated records, files, and identifiers associated with such records and files, as well as values which may be contained in the computerized records (241) and generates a graphical display of the statistics, such as pie graphs or bar graphs, such displays showing the results of the previously selected statistics filter fields such as contracts, certificates, or licensees divided by active, expiring, expired, including percentages, color indicators, and numerical totals of the contracts, certificates, licensees, or other documents which have been selected for statistical analysis by user activation of statistics subsystem 33.

With regard to form builder subsystem 23, once user input has been received to filter the data records in Library 77 by MUD 51 and Resident 53 (FIG. 1), a form field is displayed for receiving user input for a topic or type of form to be generated and transmitted (245). The general functions of form builder subsystem 23 may encompass communications from property management personnel 55, 57 to Resident 51 which require input from Resident 51 or completion of associated forms by such residents. For example, forms to be transmitted by the system to designated residents and which provide for inputting information from such residents and return, may involve bike registrations so that bikes on the premises of the MUD are appropriately accounted for, parking permit forms for the same purposes as discussed above for bikes, referral fees to current residents or through brokerages, rental credit involving specifics to be provided by the resident, waivers of liability in connection with tenant's use of facilities, abandoned property notices, bed bug treatment preparation forms, gathering of information relating to incident reports from residents, information required from residents to set up accounts or to facilitate other transactions relating to occupancy of the MUD by the resident, water pressure, surveys, or other tenant satisfaction surveys, and the like. Form builder subsystem 23 likewise includes suitable subroutines or other programs for tracking the generation of the appropriated form, its date of transmission, and return, as well as generating appropriate reminders automatically in the event the form is not returned by pre-determined deadlines (247).

Certificates subsystem 27, licenses subsystem 31, and contracts subsystem 29, operate through respective computer programming, subroutines, and other similar executable instructions (249) so as to display on a suitable graphical user interface data input fields, generally for completion by property management personnel 55 or regional managers 57. Input fields generated by programming at step 241 receive suitable input used to update or create records of certificates, licenses, and contracts, respectively for storage in appropriate files of the library or other associated databases, including potential remote dropboxes or other cloud storage of such documents. Security for such documents is at a level appropriate to their sensitivity with regard to financial and other particulars associated with the MUDS 51 under management. Among the inputs received in creating records for certificates, licenses, and contracts are the expiration or renewal dates associated with such items, and suitable programming processes such expiration dates in order to generate status indicators (251), such status indicators as having a good "status" in terms of the expiration date, a soon-to-expire status, an expired status, and the like. Subsystems 27, 29, 31 likewise permit user-initiated sorting or filtering of associated records by any number of parameters, whether by building, status indicator, type of certificate, license, or contract, responsible individual, and other fields associated with the stored records of the certificates, licenses, or contract (253). The sorted or filtered records may likewise be further processed so that only a subset of the records satisfying the sort or filter criterium is generated and displayed (255).

With regard to move-in/move-out subsystem 21, once a rental unit associated with moving in and moving out has been suitably inputted, a template is retrieved from the library of property management system 10 and is displayed with various condition report fields for receiving input from the user, typically property management or staff, the input generally corresponding to amenities associated with the rental unit (231).

In one potential implementation, certain entries in the conditions report fields, such as an indication of a need for repair or replacement of an appliance, carpet, fixtures, door, or closets, may result in transmission of a repair or replacement order to the appropriate personnel or to a production scheduler having an associated database for scheduling repairs or replacements to apartment units (235). Move-in/move-out subsystem 21 likewise includes suitable programming such that an amenity score associated with moving in or moving out is updated based on user input (237) and, depending on change in the value of the amenity score, a pricing adjustment to the rental is made by associated programming (241).

The subsystems 25 shown schematically in FIG. 2 are able to be launched or otherwise initiated from a suitable electronic menu panel displayed on one or more screens of graphical user interface 75. User input corresponding to a selected one of the multiple property management functions of subsystems 25 is received, whether by selection or data entry. Thereafter, in the case of a graphical user interface for interface 75, suitable programming displays a series of user-perceptible screens corresponding to the selected subsystem.

Some or all of subsystems 25 are provided with programming which displays the series of screens in a predetermined or programmed order and thereby establishes for property managers 55 a consistent and corresponding work flow for the associated property management function or functions. In such implementations, a first screen of the series may be displayed for filtering property data stored in library 77 or otherwise associated with property management system 10. For example, one or all of the MUDS 51 managed by system 10 may be selected and upon such selection, the property data associated with corresponding records of the library is filtered. In certain implementations, the work flow restricts display of subsequent screens until after input has been received in the first screen and its associated filter field or fields.

With regard to resident assistance subsystem 35, input fields are generated to create records for residents who may have special needs arising either from physical disabilities, veterans status, or other impairments (257). Suitable input of limitations and disabilities may allow a resident assistance engine 259 to arrange transportation, care, or other accommodations, either in response to scheduled events, in response to entry of certain data, or on an ad hoc basis in response to input from property managers 55 and associated staff.

Figure 4:
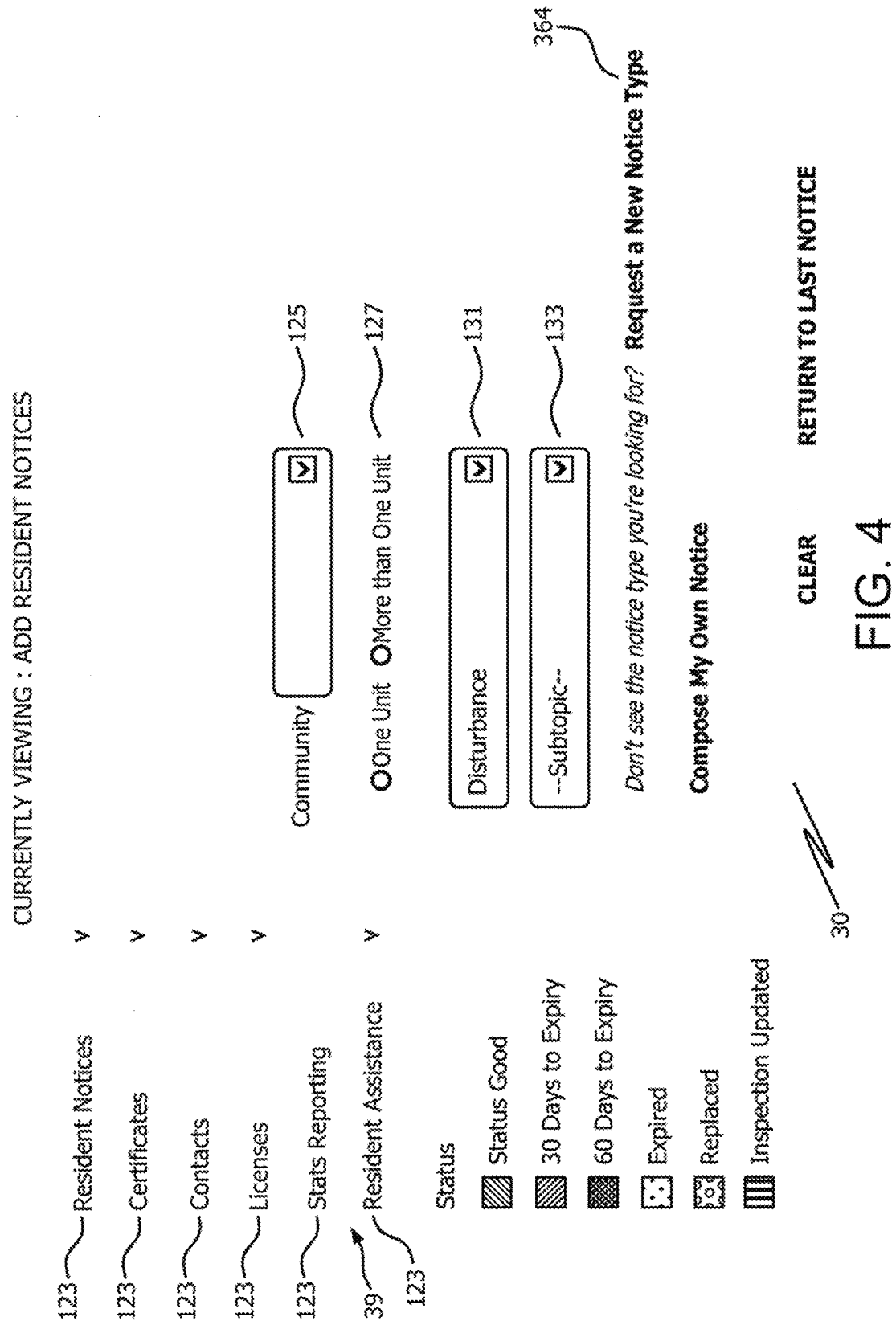

Referring to FIG. 4, suitable programming displays on opening page 30 a panel menu 39 having user-selectable fields 41 corresponding to subsystems 25 of system 10. In response to users' selection of one or more fields 41, system 10 executes instructions corresponding to launching or accessing of the selected subsystem(s) 25. Subsystems 25 accessible through fields 41 are identified with suitable corresponding indicia, such as Resident Notices 31, Certificates 32, Contracts 33, Licenses 34, Stats Reporting 35, Resident Assistance 36, and Status 37.

In response to user selection of fields 41 and execution of appropriate programming corresponding to the selected subsystem's, the graphical user interface of system 10 may display further user-selectable fields corresponding to the selected subsystem. In the implementation illustrated in FIG. 2, system 10 has responded to user-selection of Resident Notice indicia 31 to display further user-selectable fields 43.

Having described the user-activatable property management functions and associated subsystems 25 in general, operations and associated programming of particular subsystems will now be presented in more detail.

Resident Notice Subsystem

Referring now to FIGS. 1-7, subsystems 25 are launched or selected through a suitable screen of graphical user interface 75 shown in FIG. 4. A screen 30 includes a menu panel 39 running along the left portion of screen 30 with user-selectable panel options 123 corresponding to subsystems of property management system 10. A user-selectable field 122 corresponding to launching of resident notice subsystem 22 can be selected by suitable user input. Upon receiving input corresponding to selection of resident notice subsystem 22, suitable programming displays filter fields (step 323, FIG. 3). Filter fields include a first filter field 125, corresponding to a community, that is, one or more multi-unit dwellings 51 at a particular location. Field 125 may include a pop-up menu listing the set of communities or multi-unit dwellings 51 under management of property management system 10. In order to establish a work flow for the automated generation of resident notices using subsystem 22, further inputs into other filter fields of screen 30 are restricted until a selection is made for community filter field 125, which in turn then requires a selection of one unit or multiple units in associated unit filter fields 127. After completion of field 127, the user is required to associate a name of resident 53 and a unit. Thereafter, a topic filter field 131 is enabled for input, topic field 131 in this implementation comprising a selectable pop-up list which lists multiple selectable fields to which the resident notice to be generated may pertain. As illustrated in FIG. 4, one possible topic relates to a disturbance, and corresponding indicia are displayed upon user selection in topic field 131.

Resident notice subsystem 22 may be one of the subsystems of property management system 10, as in this implementation or, alternately, resident notice subsystem 22 may be a standalone computerized system for performing the functions of automatic generation of notices to residents of leased premises in one or more apartment buildings, as described generally above. In either implementation, topics are programmed into subsystem 22 and associated library records to encompass most if not all of the anticipated notices encountered during management of associated multi-unit dwellings 51. In this way, users such as property managers 53 are guided to standardized notice components and a prescribed, programmed set of options. On an exception basis, a user may launch programming to request a new notice type or compose a notice in free form (364).

Returning to the templates selectable from the computer-displayed list of topics, templates may be generated from a pop-up topic list upon selection of indicia, including: access needed, BBX grill not permitted, cleanliness issues, contact needed, damages, disturbance (shown after user-selection in FIG. 4), drugs/substance abuse, fire safety, improper use of amenities, improper use of apartment interior, improper use of facilities, non-approved persons, parking violation, non-approved pet, seeking information, stolen item, termination, trash.

Suitable programming responds to input of a related topic in field 131 (step 325, FIG. 3) and until the topic field has received input programming does not permit access to subtopic field 133. Subtopics are selectively displayable through a pull down menu. Library 77 includes records with identifies to associate each of the topics with a plurality of subtopics associated therewith. Programming limits further progress in the associated work-flow until suitable selection of a subtopic (step 327) from the corresponding list of subtopics generated after receiving topic field input (step 326). Input fields 125, 127, 131, and 135 may be displayed in any suitable visually perceptible manner through graphical user interface 75, in this case appearing in the right hand side of screen 30 as shown in FIG. 4.

Upon selection of one of the subtopics from subtopic field 133, the programmed series of steps associated with the work flow for generating notices requires designation of the warning-type, such as through a separate pop up window (step 329, FIG. 3), and the system restricts generation of the corresponding resident notice template until receiving the user input corresponding to the warning type field, that is, first notice, second notice, third notice, and the like. After suitable user input as to the warning-type in step 329, the system takes the various inputs into filter fields 125, 127, topic field 121, subtopic field 133, the warning type, and the corresponding notice template 135 and the notice components 137, along with the various user-selectable fields to be associated therewith, in step 331, and thereafter displays such template in step 333 along with user-selectable fields enabled for receiving input therein, whether by text entry or pull down menu selections, or in response to prompts, or other suitable input means (including written or oral). Notice template 135 has a plurality of notice components 137 displayed therein, notice components 137 being suitably associated for computer processing purposes with the notice template 135 by identifiers or other computer-related indications.

Figure 5:
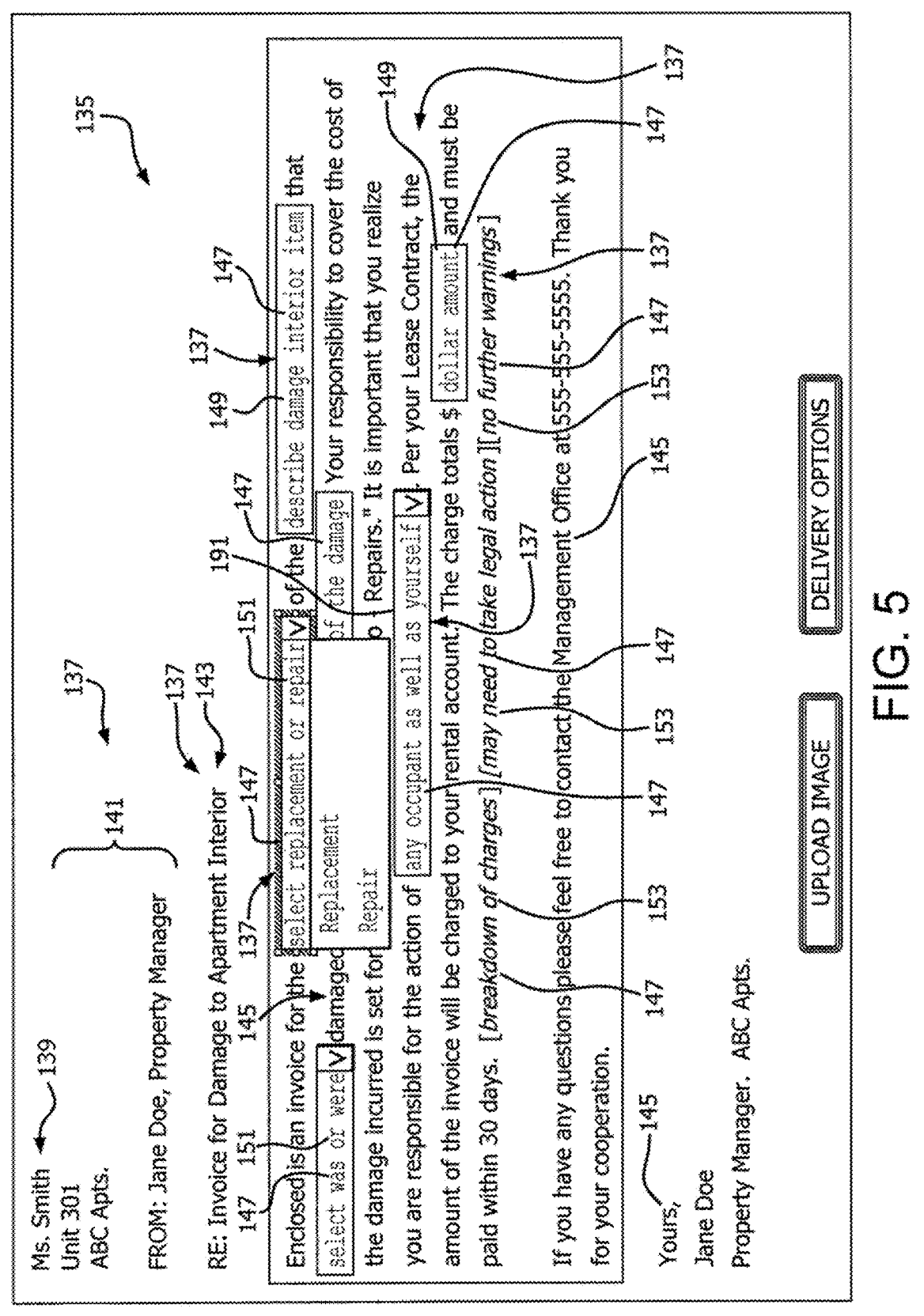

Having determined the notice components 137 and user-selectable fields of the template to be generated (step 331), the system displays notice template 135 through graphical user interface 75, such as on a computer generated screen, a screenshot of which is shown as FIG. 5. Notice components 137 include a resident name field completed by previous selection, such name field shown at 139, an address field 141, also prepopulated by virtue of previous selections in previous screens of the resident notice workflow, a subject line 143 (prepopulated) and a corresponding subtopic 135 previously selected in previous screens of the workflow.

Notice components 137 either themselves become part of the notice to be generated, or allow user selection or input to generate parts of the notice. As such, components 137 may include portions which are unalterable by the user, such as standard text blocks 145 shown in FIG. 5. Notice components 137 may further include user-selectable notice fields 147 suitably programmed to display prompts for user input and receive user input by either menu selection or keyboard or other input. Certain of user-selectable notice fields 147 include further prompts with text or other indicia 149, indicating to the user the nature of the input to be provided in the corresponding field 147, or selection indicia 151 indicating a selection the user is to make, such as through a pull down menu associated with the notice field 147. In this case selection indicia 151, when clicked by the user, reveals a drop down menu of two options to include the text of "replacement" or "repair."

User-selectable notice fields 147 may be located so as to be adjacent unalterable notice components, such as in this implementation, where selection field 151 has unalterable fields on either side.

User-selectable fields 147 may also include user-selectable zones 153 which correspond to optional text blocks 155 displayed upon selection, as seen in FIG. 6. These user-selectable zones 153 are suitably labeled with indicia to indicate the general subject matter of the corresponding text blocks displayable upon selection, in this case, for example, one block indicating "no further warnings shall be given," another text block indicating the possibility of legal action, and a third text block 155 corresponding to a breakdown of charges related to the damages of the interior of the apartment unit.

As seen in FIG. 6, text blocks 155 displayed in response to selection of zones 153 may themselves include further user-selectable subfields 157 for receiving input through keyboarding or user selections from a drop down menu, and the like.

Text blocks 147, as seen in FIG. 5, may relate to gender, tense, conjugation, and other grammatical aspects, an example of which is shown as selecting between the singular and plural for the past tense of the verb "to be," that is, "was," or "were,". This way, by way of example, standard text blocks may be used for either a male recipient, female recipient, or plural recipients, because such standard text blocks have been configured so that appropriate sentences have user selection of gender, tense, and singular/plural. In this way, standard text can be rolled out to assure a certain level of standardization among the notice components, while such standardization can be slightly modified to address the gender or number of recipients.

The resident notice subsystem 22, and any other subsystems of property management system 10, may include a system administrator interface with associated system administrator privileges. Such administrator may be able to change the texts of various notice components 137, may be able to likewise change which of user-selectable notice fields 147 are required to be completed before proceeding to the next screen or next programming steps, and may otherwise alter the notice templates 135 so as to fit the particular needs of one or more of the multi-unit dwellings 51. As such, a version of property management system 10 and associated electronic files of library 77 may include default text associated with notice components, may include default restrictions on users requiring completion of certain fields before proceeding to other fields, and may include a default listing of topics, sub topics, and the like. The ability to change such defaults may be restricted from users such as property managers 55 or regional managers 57; whereas, an administrator through an administrator's interface may be able to change such defaults so as to be appropriate and customized to the MUDs 51 and associated community.

Subsystem 22 for generating notices may likewise give property managers 55 the option of transmitting a notice generated through the workflow in draft form to one or more of the regional managers 57 with access to property management system 10. Suitable programming may automate notification, approval, or signoff by one or more of the regional managers 57, after which appropriate delivery of the notice thus generated by subsystem 22 may be performed.

Still further, in response to user selection of multiple units, notice subsystem 22 may include topics more akin to general announcements applicable to multiple buildings or communities, events, celebrations and the like, and corresponding templates 135 would be retrievable and subject to user generation using some or all of the functionality previously discussed with reference to individual unit notices.

Notices generated after operation of notice subsystem 22 are suitably stored electronically for access subsequently, such as in library 77 or suitable relational database. Metadata, pointers, fields or other indicators relate the notice generated to the resident(s) or occupant(s) concerned. In the case of a single notice to multiple units or residents, suitable pointers or other indicators associate such notice with each unit/resident or store a copy outright in each unit/resident file.

Furthermore, while certain examples have been given with respect to user-selectable zones 153 in relation to the topic identified by indicia "Damages," it would be appreciated that zones 153 may include any number of corresponding text blocks, including hints for the user to specify actions and consequences to the resident depending on the severity of the infraction or violation. Thus, for example, if access is required of a unit and was previously denied, the zone 153 may include suitable indicia so that the user may specify that a locksmith or other professional will be employed if access is once again denied. Other hints may involve billing the resident for such supplemental services if necessary. The zones 153 which are optionally added in the process of generating the notice may either be standard non-editable text, may have editable portions, or may be any combination of the foregoing, including dropdown menus and other user-selectable fields. Since these zones 153 are optional, as opposed to other notice components 137 which are not, suitable programming associated with zones 153 will permit a previously selected text block 155 associated with one of zones 153 to be deselected from inclusion in the notice being generated, such as by user selection or toggling of the appropriate one of zones 153.

In another variation of resident notice subsystem 22, a user who needs to create a notice may choose from pull down menu a topic labelled "Disturbance," (FIG. 4) the reason that the notice is being created. The "Subtopic" field 133 allows the user the discretion to add additional specificity as to the "Disturbance" by selecting, for example, "After Midnight" to the "Noise Complaint" section of the notice to the offending tenant that was selected.

If there is a request for resident cooperation, a range of consequences from mild to more serious are available to state in the case in which the resident does not comply with the notice as can be added by the user by accessing the language accessible through drop down menu 36. Additionally, the subsystem provides for more serious levels of tone in instances in which there may be a range of phrases or sentences to be applied to the situation at hand. The subsystem includes standard text from other types of notice (in instances of multiple or combined violations) as well as text from prior notices to the same resident.

The instant system includes a customization of voice when notices are to be directed to one of several residents in a unit or to all residents in the apartment complex. Other inclusions, such as a customized salutation or greeting, or a lighthearted closing reference to the state of the weather, can also be selected by the manager, such salutation, greeting, or closing either being selectable from multiple options or able to be inputted by suitable typed or spoken entry, and either editable or non-editable. Given the importance of striking the right tone with residents to assure smooth and efficient property management, the programming for those notice components 137 which are related to the notice salutation includes subroutines for accessing, when appropriate for the selected tone, resident/occupant first names for completing appropriate notice components. In the case of multiple addressees, the subsystem 22 is suitably programmed to be capable of listing multiple first names in adjacent, comma-separated fields. In this way, each resident receives a personal touch, if a light-hearted notice, or is placed "on notice" by specific first name, for more serious matters. Regardless, auto-filling programming of all resident names saves time in generating the notice.

In still other possible implementations, during one or more initial phases of creating a notice using notice subsystem 22, a pop up window or screen may be presented for user input, such input related to previous notices for the previously selected unit or resident that the user has selected to generate another notice for. So, for example, suitable programming may display notices for the same unit or the same residents either on the same topic, the same subtopic, or on other topics. The display of such related notices may likewise include programming to allow the user to cut and paste text from the previous notices into the current notice being prepared by the user, may permit certain user-selectable zones or fields on the current notice to be activated as a result of the previous notices, or may otherwise initiate options in the notice being generated which are associated with the existence of the one or more previous notices.

As part of notice generation or as a separate item selectable from menu panel 39 (FIG. 4), resident notice subsystem 22 may include a history of notices sortable and/or filterable by multiunit dwelling 51, resident 53, or one or more units associated therewith.

In still other possible implementations, the resident notice subsystem may make use of property data setting out residents, that is, signatories on leases, and occupants, that is, minors and other individuals occupying the leased premises. The names of occupants and residents may be displayed by suitable programming at one or more points during the notice generation workflow associated with resident notice subsystem 22. In this way, notices related to actions of occupants may be tailored to specify the identity of such occupants, while at the same time such notices may be directed to the responsible lease signors, that is, the residents whose names have also been made available for use by the user in generating the notice.

The resident notice subsystem 22 may likewise permit the selective attachment of external documents to any one of the notices to be generated, such external documents being attachable either through separate screens or pop-up windows, or by suitable fields within one or more notice components 137 or associated notice templates 135. Thus, for example, in the event of invoicing residents for damage, charges, or other services, associated back up in the form of third-party invoices or photos may be provided as needed, or associated documents for counter signature and return by such residents may likewise be provided. It will be appreciated that the foregoing exemplary attachments are just that, and other possible attachments are likewise within the scope of this disclosure.

After resident notice subsystem notice 22 receives user input into the various user-selectable notice fields 147 described above (step 335, FIG. 3), suitable programming may require user input in order to proceed, such as upon determining a required one of user-selectable notice fields 147 of notice template 135 remains blank. In the affirmative, in response to user attempts to generate the notice, a suitable visual indication is made that additional inputs into user-selectable fields 147 is required.

In the event all required fields have been completed, (step 337, FIG. 3), suitable programming generates the resulting notice in step 339 in electronic form 159, as shown in FIG. 7. Electronic notice 159 includes a display of outputs 161 and 163 corresponding to the inputs previously received by the system through user-selectable notice fields 147, whether such fields require text entry, menu selections, or added optional text blocks relating to certain subject matters (as in zones 153, FIG. 5).

After electronic generation of the resident notice in step 339, delivery options are displayed, such as through a pop-up window or series of screens, each having fields for user input corresponding to at least one delivery option. Thus, for example, one or more options of under-door delivery, hand delivery, regular mail, and certified mail may be selected in one of the initial delivery option user input fields. In response to selection of a certified mail option, the work flow may display a field requiring input of the certified mail number before proceeding further. Delivery option may likewise include email or print, in which case, in response to receiving user input, system 10 includes or has access to a printer driver and associated printer or an email system enabled to receive further user input as needed to transmit the resident notice by print or email, respectively.

Certificates Subsystem

Certificates subsystem 27, and its programming and associated work flow will be described with reference to FIG. 8. From the menu options from panel menu 39 (FIG. 4) upon receiving a user selection from panel options 123 corresponding to certificate subsystem 27, suitable programming receives the corresponding selection of the certificate subsystem in steps 821. When certificates subsystem 27 is operated by the user to enter data for certificates corresponding to one or more buildings, the system receives inputs via data entry fields to generate certificate records, including receiving a certificate expiration date (step 823). When sufficient inputs have been generated, as required by certificate subsystem 27, certificate records are created and stored in library 77 or other suitable database. Library 77 likewise includes one or more templates which may be displayed in conjunction with data entry fields in previous step 823, for establishing a corresponding workflow related to certificate entry.

Data entry fields which may be inputted into certificate templates or directly into library 77. Certificate records may include a certificate record identifier to associate a unique control number with the certificate, a certificate type such as fire extinguisher, elevator, standpipe and sprinklers, pool, boiler, fire alarm, and the like; data entry fields may likewise include a building, a date issued, the expiration date as previously mentioned, a first contact person, a second contact person, a responsible contractor, a specific unit description, that is, a building or other physical location corresponding to the certified unit. User inputs are associated with certificate field identifiers (e.g. headers) to create certificate records which can be systematically accessed, sorted for display, and otherwise processed by certificate subsystem 27.

One of the features of certificate subsystem 27 allows the computer to be operated in a manner to determine a status indicator for each of the certificate records having the expiration date field inputted (step 825). In this implementation, status indicators may relate to upcoming or actual expiration of a corresponding one of the certificates which is the subject of a certificate record accessible by certificate subsystem 27.

Subsystem 27 is operable in an improved manner to graphically display indicia on graphical user interface 75 corresponding not only to the certificate records, but to the status of such certificates, the display indicia including, for example, multiple, different color indicators corresponding to respective ones of the status indicators. In one possible implementation, when the certificate is in active status and expiration is not for several months, it may be associated with a color status indicator of green, indicating status good; likewise, if the system is 60 days from expiry, another color such as yellow, might be employed, if only 30 days from expiry, another differentiating color of orange may be generated as a status indicator, and if expired, a red status indicator is generated by the system. The system associates the color indicators with suitable information on the certificate, and users may select one or more of the status indicators to display only those certificate records corresponding to such status (step 827).

Figure 8:
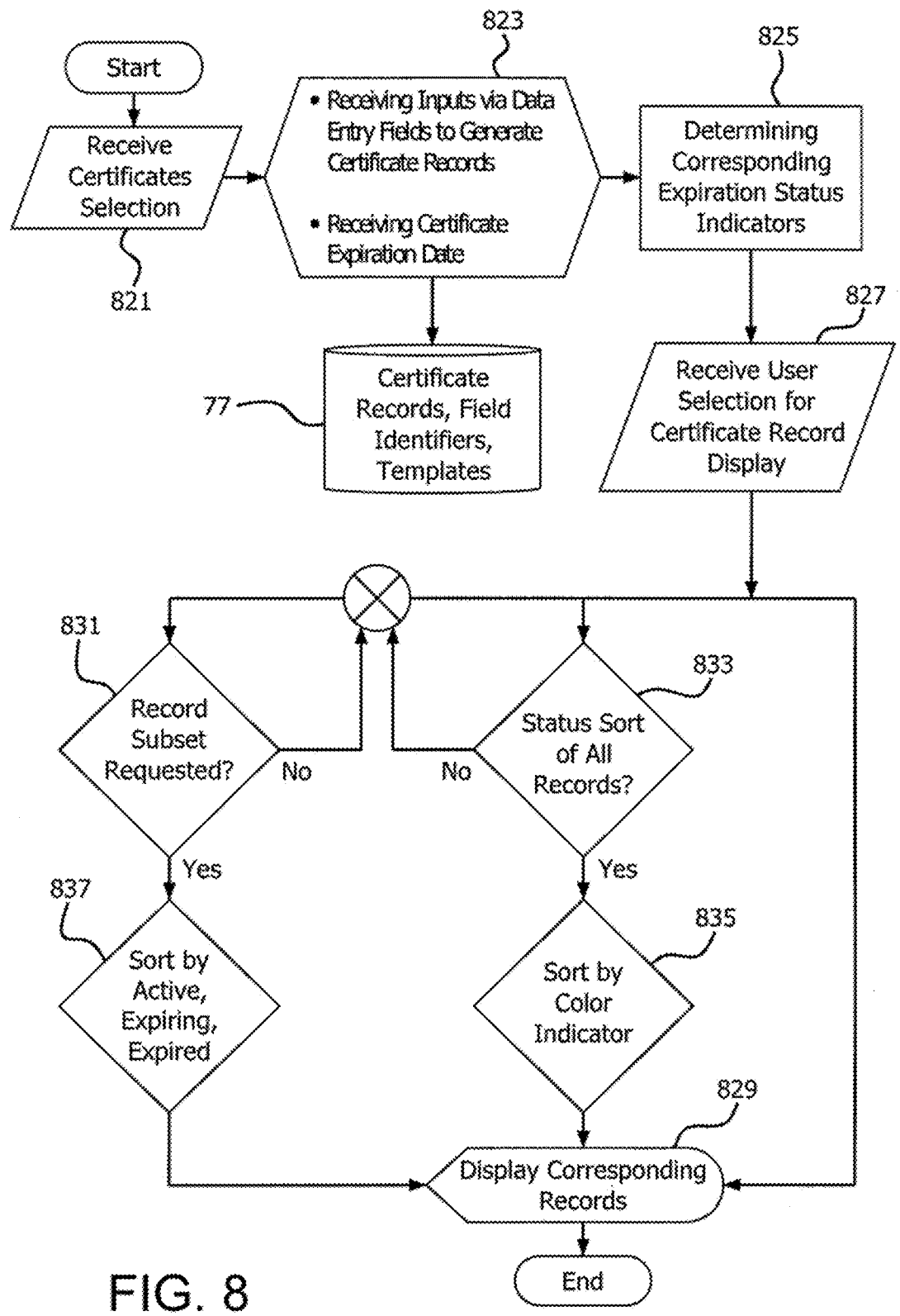
FIG. 8 is a flow chart of another possible implementation of a certificate engine or subsystem of the current disclosure.

The sorting, filtering, and selection of one or more certificate records by status indicator may assume any number of variations, as set out in FIG. 8, including displaying corresponding records as directly selected by the user (step 829) displaying a subset of the certificate records in step 831, such as by building, type (e.g., elevator, fire extinguishers, etc.), may sort all records across all buildings by the status indicator (step 833), may sort such records not only by status but by color (step 835), and may likewise sort by status the subset of records filtered in step 831, such sorting being by active, expiring or expired occurring in step 837. Sorting, filtering and other operations by the user are displayed in step 829 discussed previously.

Move-In/Move-Out Subsystem

Figure 9:
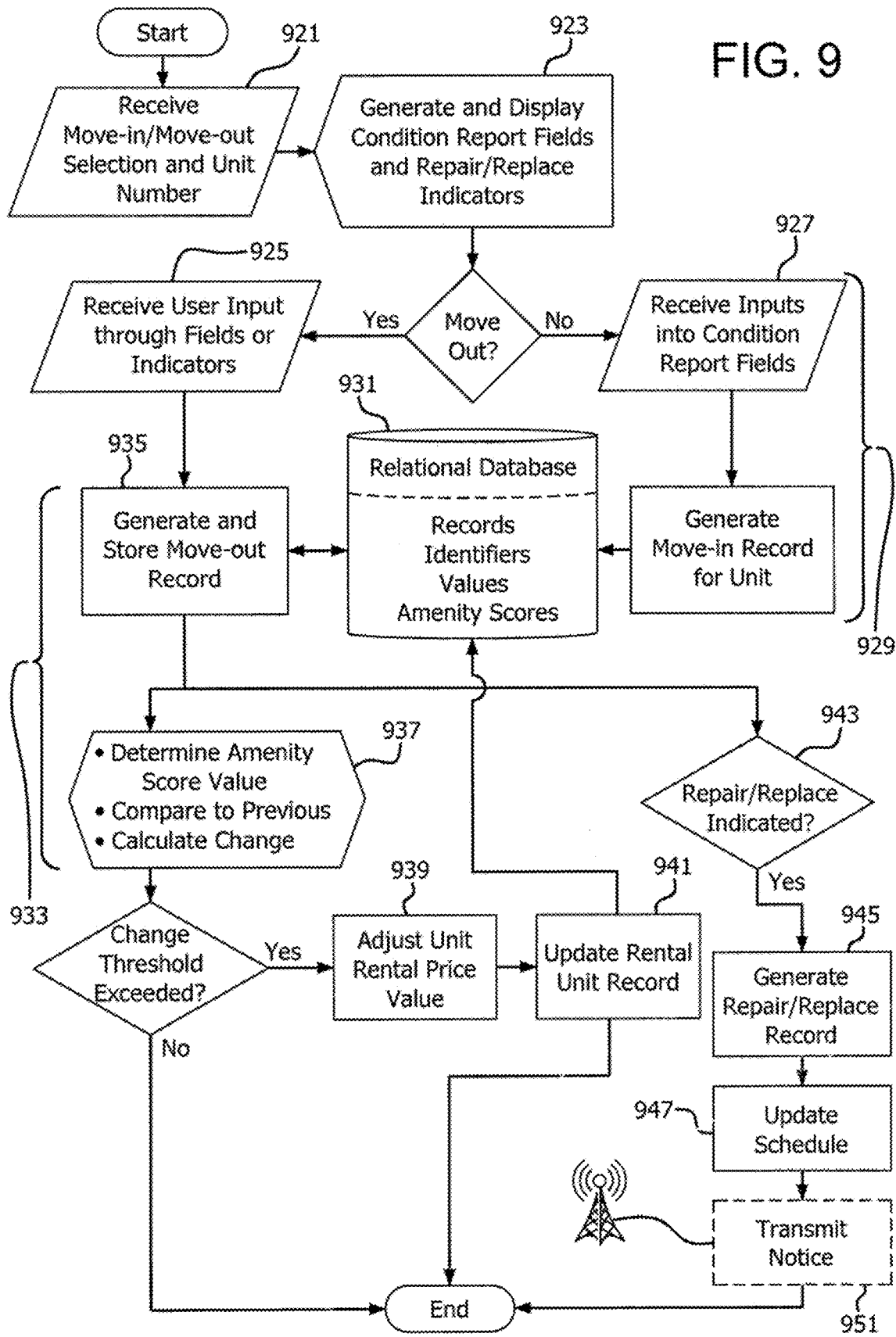
FIG. 9 is a flow chart of a move-in/move-out engine or subsystem of the current disclosure.

The move-in/move-out subsystem 21 will now be described in reference to FIG. 9. Move-in/move-out subsystem 21 receives indication that it was selected from panel menu 39 and further receives an associated input from the user corresponding to the unit number subject to the moving in or moving out workflow (step 921). After user selection of a selected one of the units, suitable programming generates and displays a move-in/move-out template on a suitable graphical user interface 75 (FIG. 1), whether on a tablet, personal electronic device, laptop, a desktop computer or other equivalent displays. It should be noted that reference to graphical user interface 75 does not preclude using other user interfaces, which are hereby defined to be included within the phrase "graphical user interface," such as a series of voice prompts or other auditory interfaces, and any number of devices for receiving user input into system 10.

In this implementation, graphical user interface 75 comprises a visual interface and includes condition report fields as part of conditions report template 231 (FIG. 2), the condition report fields being generated to receive user input, along with repair/replace indicators which can be user activated, as set out in steps 923 and 925 and 927. Condition report fields correspond to respective amenities of the selected one of the units, such as appliances, carpet, fixtures, doors, closets, and walls, as set out in the schematic of FIG. 2 at reference 233.

The conditions associated with these amenities are selectively reviewable by property managers or appropriate staff or subcontractors in connection with a move-in workflow shown generally at 929 and schematically at 235 (FIG. 2). After suitable data entries in template 231 corresponding to conditions report fields, a database 931, such as, by way of example only, a relational database, is used to store records, identifiers, score values, and resulting amenity scores associated with a move-in workflow 929. A record associated with the unit upon move-in may be accessed subsequently, such as upon initiation of move-out workflow, shown generally at 933 in FIG. 9 and schematically at 231 on FIG. 2. Alternately, subsystem 21 does not need to be accessed upon moving out, rather just for move-in purposes. For moving out, records of the conditions of the units, their amenities, and associated values and scores may be stored through a series of successive record generating steps upon move-out of residents from the corresponding units. In terms of the workflow of the move-out function 933, a condition report template 231 is pulled up in response to user request and receives input into condition report fields corresponding to various amenities of the unit being vacated.

Repair report indicators may be generated either in response to entry of sufficiently low values or other triggering indicia into the condition report fields of template 231 or, alternately, user may input or provide a check mark or other activation of a repair/replace indicator, specifying, as the case may be, whether repair or replacement is required for an associated condition or amenity. In terms of executing instructions for the move-in/move-out subsystem 21, upon entry of input into condition report fields in step 925, the move-out record is generated at step 935.

Upon generation of the record, further operations involve access to and storage in database 931. For example, once system 22 indicates that the user has completed condition report template 231, system 22 determines an amenities score value at step 937, and compares such amenity score value to previously stored amenity scores for the corresponding unit to determine the amount of any change. If a change in amenity score exceeds a certain threshold, the system may automatically, or in response to user prompting, adjust the unit rental price for the associated unit (step 939). The adjusted rental price may then be communicated to update the rental units record, which update in turn may be communicated to any appropriate database listing or tracking the units of the multi-unit dwellings 51 under management of system 10, such as network storage resources 81 or associated remote databases 79 accessed by other computer systems or other parties associated with MUDs 51 under management.

Amenity score determinations (positive, negative, or unchanged) are calculated as a function of the condition report fields and associated values previously entered. In this way, pricing of individual units 53 of multi-unit dwelling 51 (FIG. 1) may be more granular than without such input and reflect the presence of actual amenities, as well as the conditions of such amenities and of the apartment as a whole, such as walls, carpeting, wear and tear.

In the event subsystem 21 detects either repair or replacement has been indicated (step 943), a corresponding record is generated and may be communicated to effectuate the indicated repairs and/or replacements. When the phrase "repair/replace" or variations thereof is used, it is intended to be both conjunctive and disjunctive in terms of repairs and/or replacements of amenities and unit conditions). In one implementation, the subsystem 21 not only generates a repair/replace record, but updates a schedule accessible by maintenance staff, contractors or other parties involved in management and maintenance of the associated MUDs 51 and the unit needing repair/replace attention.

The generation of the repair/replacement record may also trigger transmission of an electronic notification to a portable electronic device (step 951) remote from the user interface of the property management personnel, or such may be triggered by user command. Such transmission of an electronic notification (step 951) can be rendered accessible to property maintenance staff and contractors.

Amenities Inspection Engine

In one possible implementation of property management system 10, the various programming described above for determining adjusted rental price as a function of amenity value or score may take the form of an amenities inspection engine having functions accessible together with or independently of other functions of move-in/move-out subsystem 21. The amenities inspection engine has suitable programming to receive input and process amenities-related data for a number of management purposes. One of such purposes includes logging or otherwise associating certain amenities with certain units in corresponding ones of the multi-unit dwellings User-viewable screens 175 generated by the amenities inspection engine are shown in FIGS. 10-13, and programming for performing the related amenities inspection inputs and processing are described below.

Among the computer implemented functions of the amenities inspection engine is programming for assessing, whether upon move-out or at any other suitable time, the presence or absence of certain identified amenities in units, so that such amenities can be listed, tabulated, advertised or otherwise made the subject of property management, repairs, replacements, and the like, and may likewise be used to adjust the unit rental price with a granularity associated with the presence or absence of such amenity.

Figure 10:
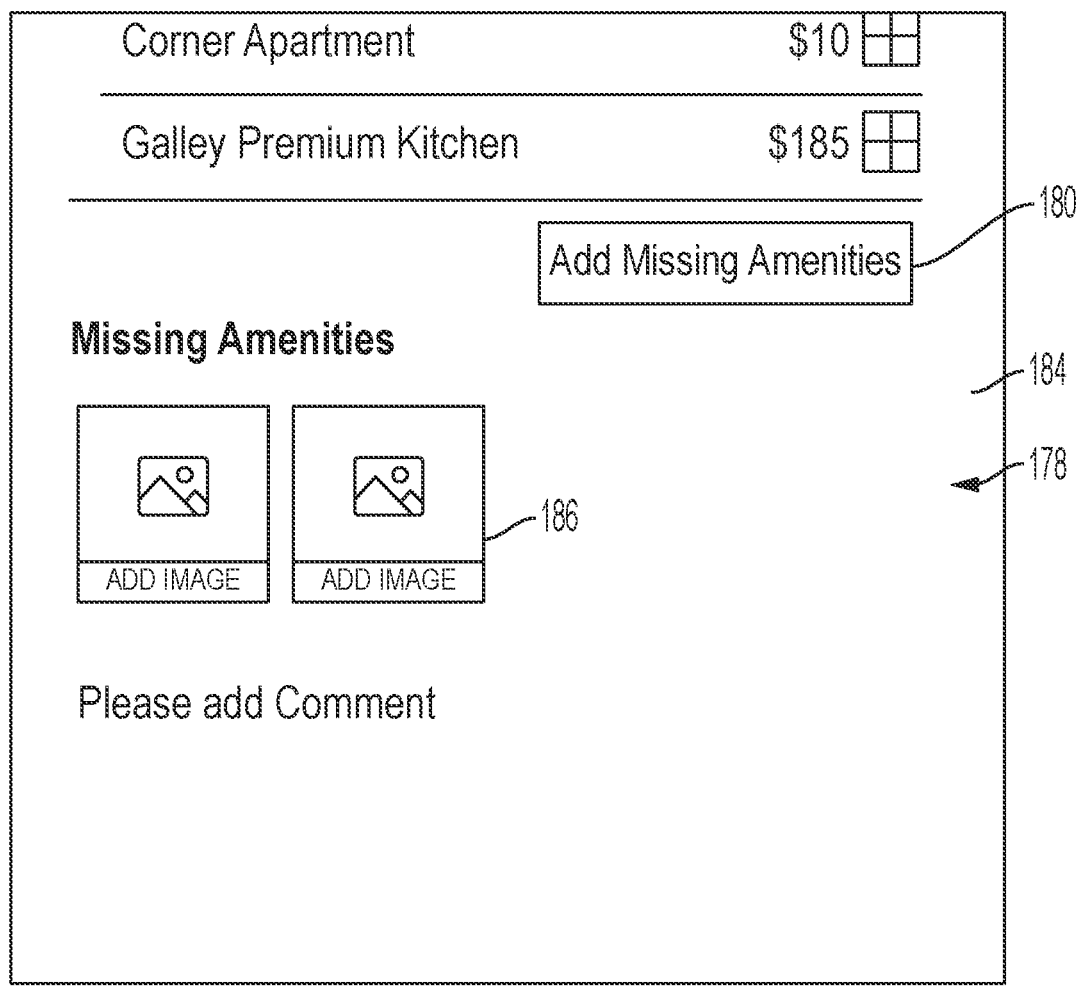
FIG. 10 is a screenshot generated by suitable programming of an amenities inspection engine according to one implementation of the current disclosure.
Figure 11:
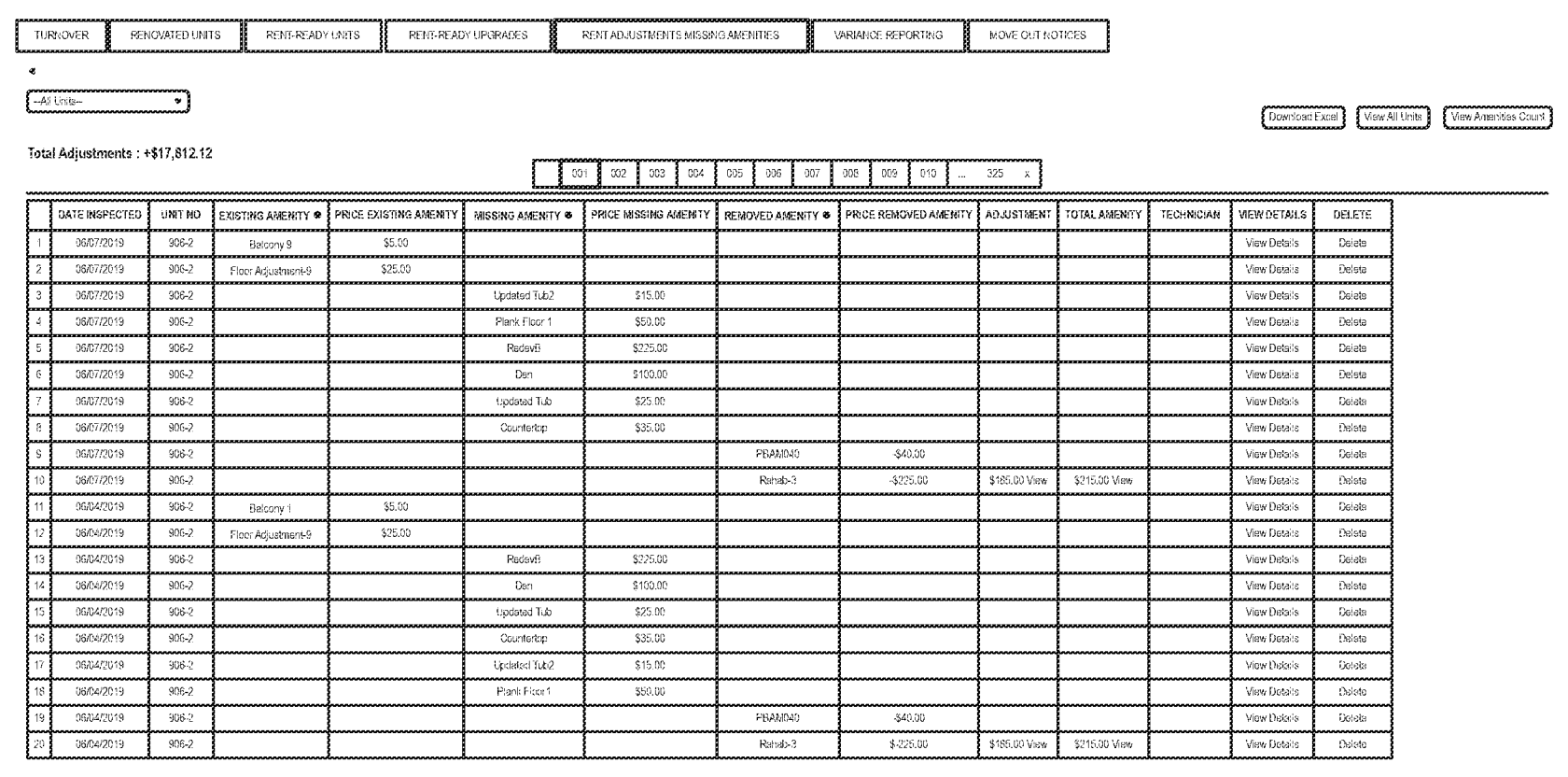

In one possible implementation, the amenities inspection engine makes use of a front-end module which receives user data inputs related to amenities of units, which amenities are recorded with the assistance of a user input screen 178 shown in FIG. 10. Input may be received during a walk-through of the physical unit corresponding to the selected unit or may be otherwise received and associated with a property data record of the unit. The amenities inspection engine makes use of a back-end module which processes data inputted from the front-end module for a variety of purposes associated with property management including, for example, the alteration of the rental price associated with the unit in which the amenity is present or absent. FIG. 11 shows one possible program implementation in which dollar values for added amenities are determined after amenity-related input at the front-end. One possible inputting method for amenities is by way of user selection from an amenities listing shown in FIG. 13 which in turn generates an amenities-to-be-added listing as shown in FIG. 10.

The amenities inspection engine selectively accesses an amenities database which has a plurality of amenity identifiers and amenity values associated with the amenity identifiers. Thus, for example, amenity identifiers may be labels describing the amenity, such as first-floor location of the unit, enhanced or gourmet kitchen, and any other suitable features which have been determined by property management to constitute part of the value of the rental unit, such as those shown in FIG. 13. The amenity identifiers are associated with amenity values, which, in this implementation, correspond to a dollar value or dollar amount associated with the amenity identifier.

As seen in FIG. 10, the front-end module of the amenities inspection engine is capable of displaying at least one existing amenity, in this case two amenities being shown with corresponding amenities indicia and an amenity value in the form of a dollar value associated with such amenity. A field 180 is displayed and programmed to be user-selectable. In response to user selection of field 180, a list of available amenities 182 (shown in FIG. 13) is displayed, such listing likewise being user-selectable by amenity and the corresponding indicia shown. In this implementation, programming of the front-end module allows multiple selections from the list of available amenities 182 to form a series of fields 184 comprising amenities to be added or missing amenities (FIG. 10). The display screens of FIGS. 10 and 13, in one possible implementation, may be displayed as part of a smart-phone app, and digital images may be associated with the added amenities listing or field 184, such as by clicking one or more picture-taking fields 186, accessing the smart-phone camera, and photographing the amenity to be added to the dwelling unit subject to amenities inspection.

The back-end module may not only determine an added amenity value corresponding to the added amenities uploaded to it from the smart-phone app and displayed in field 184, but such back-end module may likewise generate an adjusted unit rental price for the selected unit as a function of the added amenity value inputted by a user during the amenities inspection.

The added amenity values associated with the added amenities listing 184 in the front-end module are used by suitable programming, which may be at the back end, to update property data records associated with the selected unit which was or is subject to the amenities inspection.

Back-end programming may likewise sort and display multiple digital images, whether sorted or listed by amenity identifier, selected unit, and selected multi-unit dwelling. In other words, digital images of amenities may form a gallery which can be sorted for purposes of viewing detailed graphical or written information about amenities of a unit, without having to physically enter or inspect such unit. Likewise, the gallery of amenities images may be sorted into a report associated with the multi-unit dwelling or with the units and their particular associated digital images.

Figure 12:
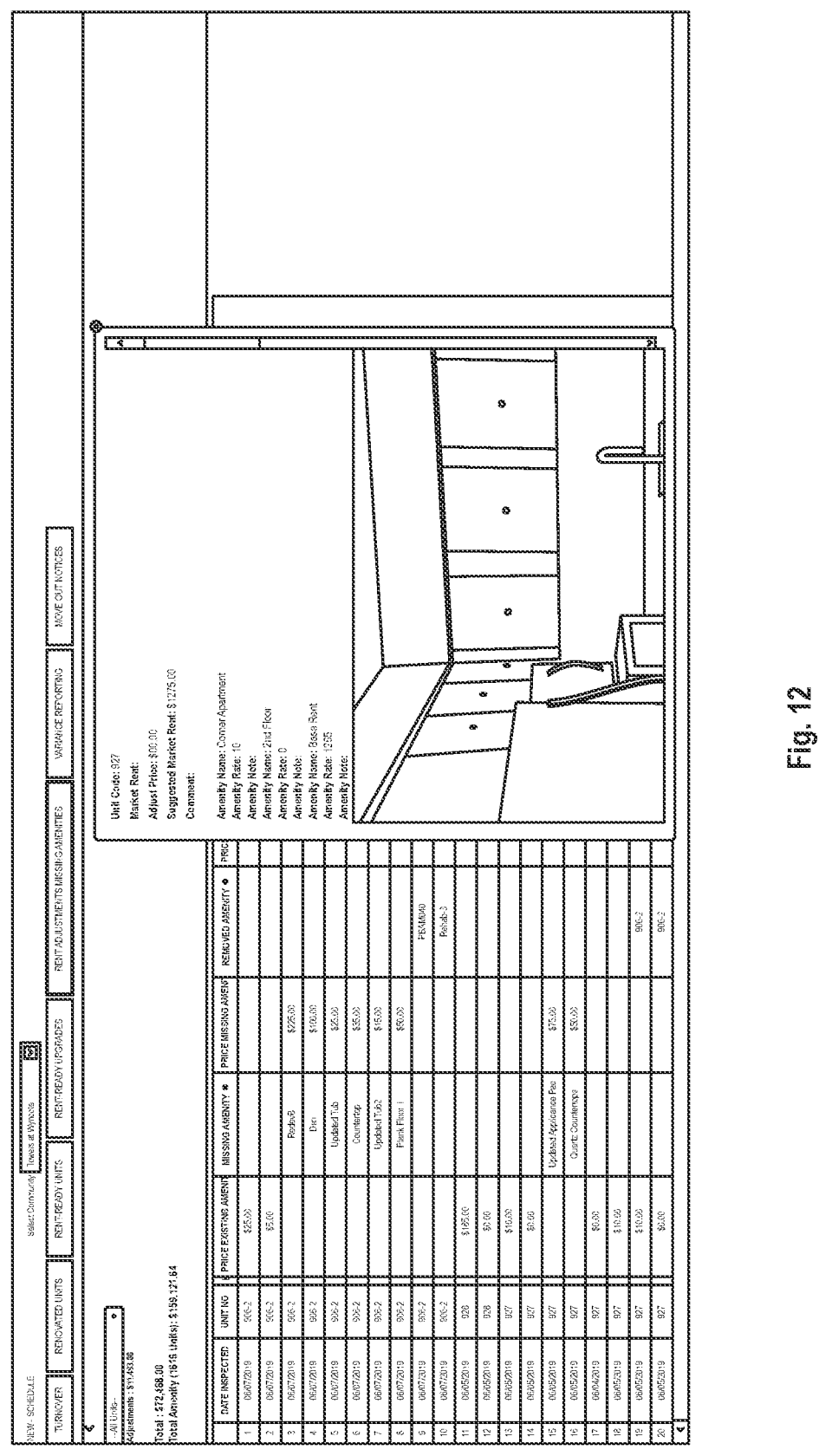

FIG. 11 illustrates sorting and display of property data records including amenities-related data. For example, one tab, bearing indicia "rent adjustments/" missing amenities" may comprise data displayed from one of several programmed functions in property management system 10 disclosed herein. The sorting and display is in the form of a spreadsheet with user-selectable fields, certain columns identifying, respectively, existing amenity, the price of the existing amenity, missing amenities (that is, amenities added or to be added), the price of the missing amenity, any removed amenity and associated price thereof, adjustments as a result of added and existing amenities, total amenity value, the technician associated with the amenities inspection which yielded the amenity data, and user-selectable fields which generate reports with digital images associated with unit numbers. FIG. 12 illustrates user selection of one field or row of the displayed data showing the market rent for an associated unit and an adjustment of $10 associated by addition of the amenity corresponding to a corner apartment.

Processing examples thus encompass appropriate unit rental adjustments to reflect added or subtracted amenities, renovation and upgrade planning to add missing amenities to units that lack them, budgeting, and related financial adjustments either by dwelling unit or by multi-unit dwelling. The processing and reports illustrated herein are merely exemplary, and it will be appreciated that adding amenities or otherwise inspecting for the presence or absence of amenities and storing such information in property data records may be used for any number of property management functions and activities all of which are the subject of this disclosure, which is not limited to the examples or exemplary embodiments described.

Accordingly, it will be appreciated that still further processing of amenity identifiers and associated amenity values by the amenities inspection engine may be performed as dictated by the requirements and needs of the property management personnel using property management system 10 and its associated amenities inspection engine. Likewise, the terms "front-end" and "back-end" are meant to include the logical interrelationship of the former primarily but not exclusively receiving input whereas the latter primarily but not exclusively processes inputs or associated data. Thus there is no physical limitation requiring front-end or back end functionality and programming to reside at certain physical locations, whether near or far to dwelling units. Accordingly the property management system and amenities inspection module may include on-premise, cloud-based, SaaS, or any number of architectures or platforms and such various implementations are within the scope of this disclosure.

Move-In/Move-Out Management and Related Workflows

Programming routines and subroutines of the above-described amenities inspection engine may be used in conjunction with the move-in/move-out subsystem 21 to perform a variety of residential unit management functions and related workflows. So, in one potential implementation, generating and storing a move-out record, such as that shown in programming described at logic block 935 on FIG. 9, may include a workflow and operations described with reference to FIG. 14, wherein the move-out record may be in the form of a move-out report.

Move-Out Report

Figure 14:
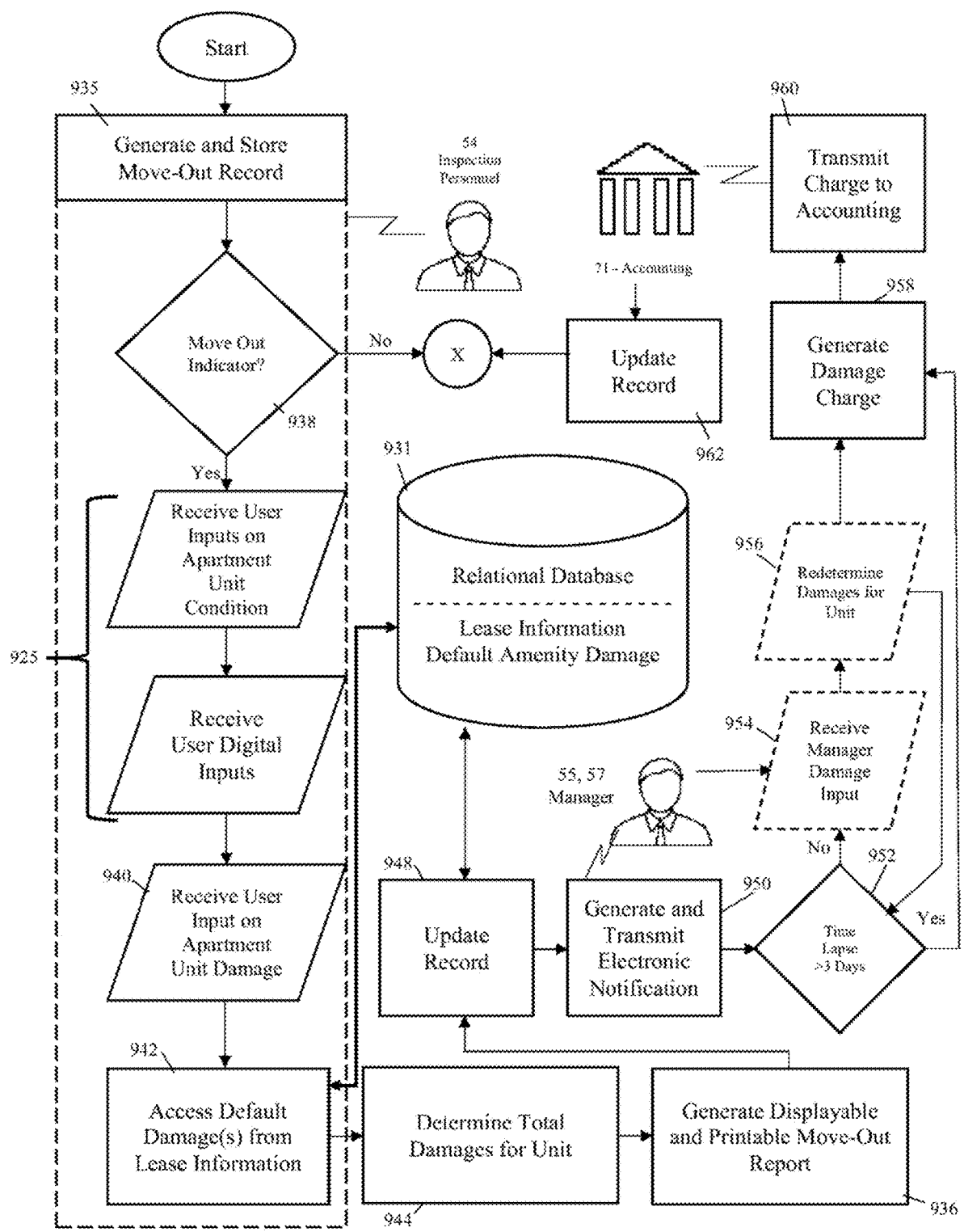
FIG. 14 is a flow chart of another possible implementation of the move-in/move-out subsystem of FIG. 9, with programming for generating a move-out report and damages charges.

It may be recalled that move-in/move-out subsystem 21 makes us of a plurality of move-in/move-out identifiers in relational database 931. Such identifiers may include a building identifier, an occupancy status identifier, and a unit identifier. For the system 10 to generate move-out reports programming detects that an identified residential unit and its associated property data record have been updated to indicate a move-out condition by associating such record with a move-out indicator (938). As shown in FIGS. 9 and 14, upon the system determination of a move-out condition for a given apartment unit, user-input is received through suitable fields or indicators, such input corresponding to conditions of the apartment unit, including amenities in its broadest sense to mean also apartment fixtures, appliances, carpeting, floors, ceilings, walls, closets, hardware, built-ins, woodwork, plumbing, cabinetry, windows, and any other aspects or features of the apartment, and the input would be any such input related to condition of such apartment aspects after the prior occupancy. Such input may include user digital input, such as in the form of photographs (925). In one version, the photographs may be inputted by use of a smartphone or other personal electronic device during the course of a move-out inspection.

As shown by the programming flow of FIG. 14, the inspector or other user 54 may provide input in suitable fields relating to apartment unit damage (940). Upon the system's receiving such input related to apartment unit damage, suitable programming accesses default apartment unit damage information, which damage information may be part of lease information associated with the property data record of the associated unit being inspected in the move-out inspection (942). Based on such default apartment unit damage information, the system determines total damages for one or more amenities or other apartment conditions received from the user (944). The system may be programmed to automatically generate a displayable and printable move-out report (936), update the associated property data record (948), and generate and transmit a suitable email or other electronic notification (950) to the property/community manager 55 and/or the regional manager 57.

Suitable programming may track the lapse of time from the generation and transmission of the electronic notification of step 950, and depending on the time lapse, perform additional functions which improve operation of property management system 10. For example, before the lapse of a predetermined amount of time, such as three days, the system may prompt managers 55, 57 for inputs from such managers to review or alter default apartment unit damages determined by the system in previous step 944. In response to the system receiving such manager damage input (954), the input acts as an "override," automatically redetermining the damages associated with the unit after its inspection (956). Upon lapse of the predetermined time (in this case, three days), programming of the move-in/move-out subsystem 21 generates a damage charge (958), either based on the default apartment unit damage calculated by the system or the redetermined damage based on the override from the manager. Thereafter, the damage charge is transmitted (960) to an accounting function 71, such accounting function performing a suitable update to financial databases and/or property data record (962), and potentially communicating the damage charges to one or more individuals, including the departed tenant.

The generation of a displayable and printable move-out report by system 10 in step 936 may be the result of a series of user-input fields, such as a checklist showing "okay" and "not okay" as a result of the user inputs, such as through a front-end personal electronic device, operated by inspection personnel 54 during the inspection. Portions of one suitable move-out report 1901 as generated and electronically displayed by programming of move-in/move-out subsystem 21 is shown in FIGS. 19A, 19B. Move-out report 1901 includes indicia corresponding to damage calculations, in this case a damage summary 1903 which is in the form of a table, the displayed indicia of which correspond to previous inputs by inspection personnel 54 during performance of amenity condition inspection at step 925 including damage charges 1905.

The move-out report 1901 generated in step 925 may likewise set out indicia corresponding to previously inputted conditions in a checklist, excerpts of which are shown in 1907. Suitable program subroutines display user-input subfields 1909 (FIG. 19B) in response to receiving certain entries in user input fields of checklist 1907, such as a "not OK" entry in this implementation. Such subfields 1909 of move-out report 1901 may permit input and a display of photographs, such as those of damaged amenities received in user-input step 925 of the inspection, in this case shown as an image 1911 of a stained carpet.

The receiving of user input (925) for generation of the move-out report (936, FIG. 14) may likewise involve programming to receive a signature of inspection personnel 54, as well as receiving a resident signature, or input that the resident was not available for signature, as well as input that the resident refused to sign the inspection report, all valuable in operation of the property management system 10 hereunder. The receipt of the foregoing inputs as part of move-out report generation (936, FIG. 14) are shown in the printable, displayable move-out report 1901 by corresponding indicia, such as management signature 1913, resident signature 195, non-availability field 1917, and refusal of signature field 1919.

Visual Tour Workflow

In still other implementations, move-in/move-out subsystem 21 may further optimize operations of property management system 10 by including programming capable of generating promotional collateral through an ordered sequence of steps to form an associated promotional collateral workflow. Such programming and related operations of system 10 allow the user to select one of the multi-unit dwellings under management by the system and then the system further receives user-input of one of the units in such multi-unit dwelling. The workflow associated with the selected unit may occur in conjunction with the move-out inspection discussed previously with reference to FIG. 14 or may be performed at any suitable point during access to the selected unit, such as after completion of cleaning, renovations, or repairs in the process of turning over or making the selected unit ready for rent.

The generation of the user promotional collateral involves the system receiving input in the form of a digital video file, such as generated during a walkthrough of the unit ready or being ready for rent, as well as an opening card data file and a closing card data file, the entry of data being cued or otherwise guided by suitable prompts generated by the programming in response to user launch of and inputs into a graphical user interface. In this way, the ordered sequence of entering data results in a visual tour of the selected unit. Suitable programming allows uploading of the data corresponding to the visual tour to the associated property data record and to data storage means associated with property management system 10.

In addition to the value of creating a visual tour for a selected unit, property management system 10 includes functions to optimize access to the visual tour from other subsystems or modules within its system 10. Thus, in one suitable implementation shown in reference to FIGS. 20 and 26, links or programming responsive to user selection may make visual tours available simultaneously with other categories of data and user viewable/selectable fields of a dashboard screen 2001 associated with production schedule 73 (FIG. 1). Dashboard screen 2001 includes a row 2005 labeled with "Visual Tour," in which are displayed indicia of the numbers of visual tours created during predetermined time periods and a total number. Such indicia include user-selectable fields 2003 corresponding to the indicia. In response to user selection of a desired one of the user-selectable fields 2003, such as the one for visual tours generated and uploaded in the last 14 days, programming retrieves visual tour data corresponding to the selected field 2003 and displays a corresponding, further table 2601 associated with the visual tour data, as shown in FIG. 26, on a display screen or other GUI. Visual tour data table 2601 may be sorted in any number of ways by sorting fields 2603, including by multi-unit dwelling (labeled "Building") and by unit within such multi-unit dwelling. Suitable programming has associated the actual visual tours associated with respective residential units through video link fields 2605 appearing on corresponding rows of table 2601. In the screen shot of table 2601 shown in FIG. 26, fields 2605 have been sorted so as to be displayed and arranged on visual tour table 2601 in an advantageous way. More specifically, video tour data of units of the same multi-unit dwelling are displayed simultaneously and adjacent each other, and thus may be readily viewed seriatim by a user, such as may be done to compare conditions, production values, or other aspects between or among the visual tours stored for comparable units in table 2601. In response to user selection of a desired one of fields 2605, programming accesses the digital video file from data stored in system 10 and displays it on the associated display or graphical user interface for playback as desired.

Production Schedule Data Processing and Dashboard

Figure 15:
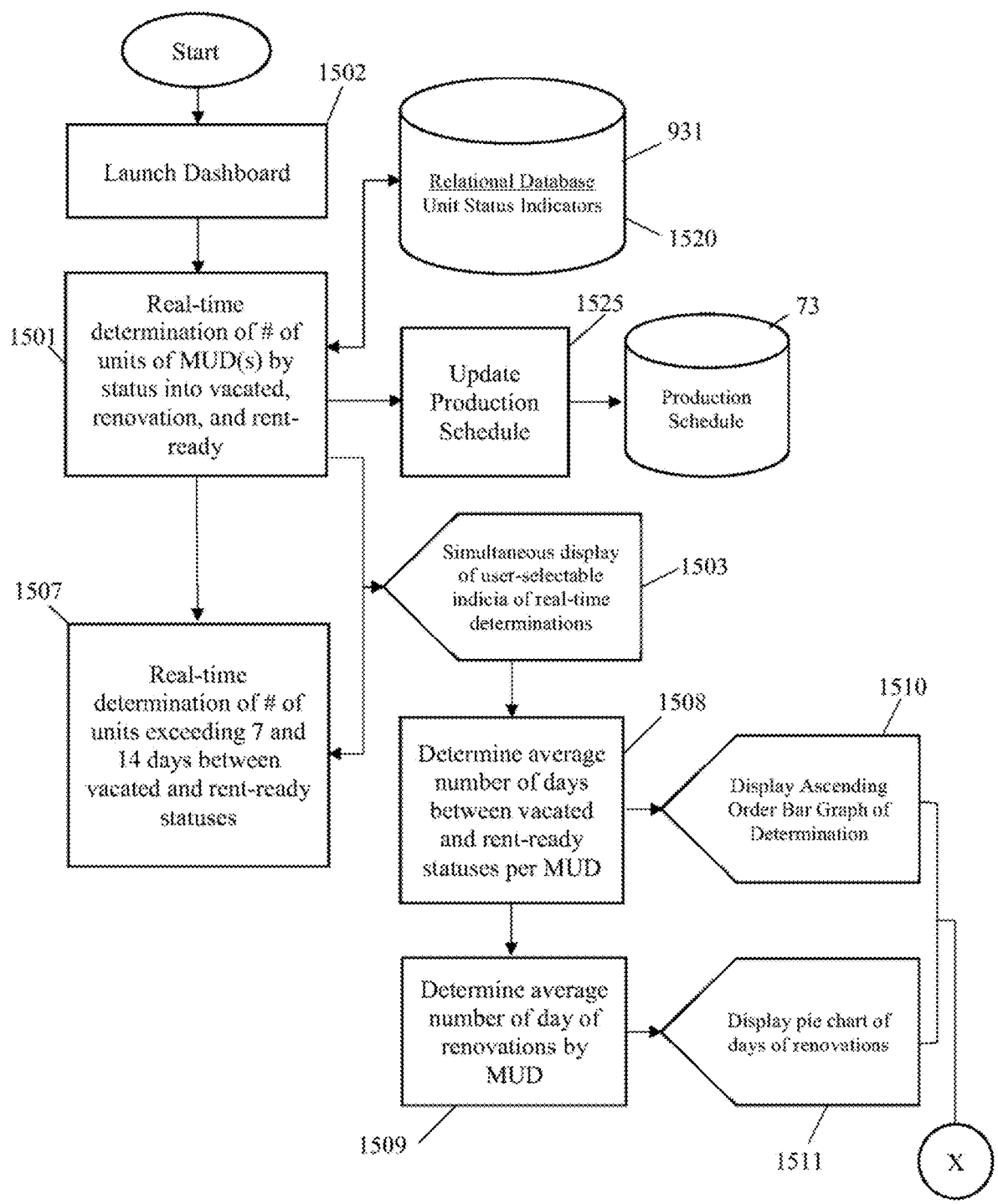
FIG. 15 is a flow chart of programming related to the production schedule.
Figure 20:
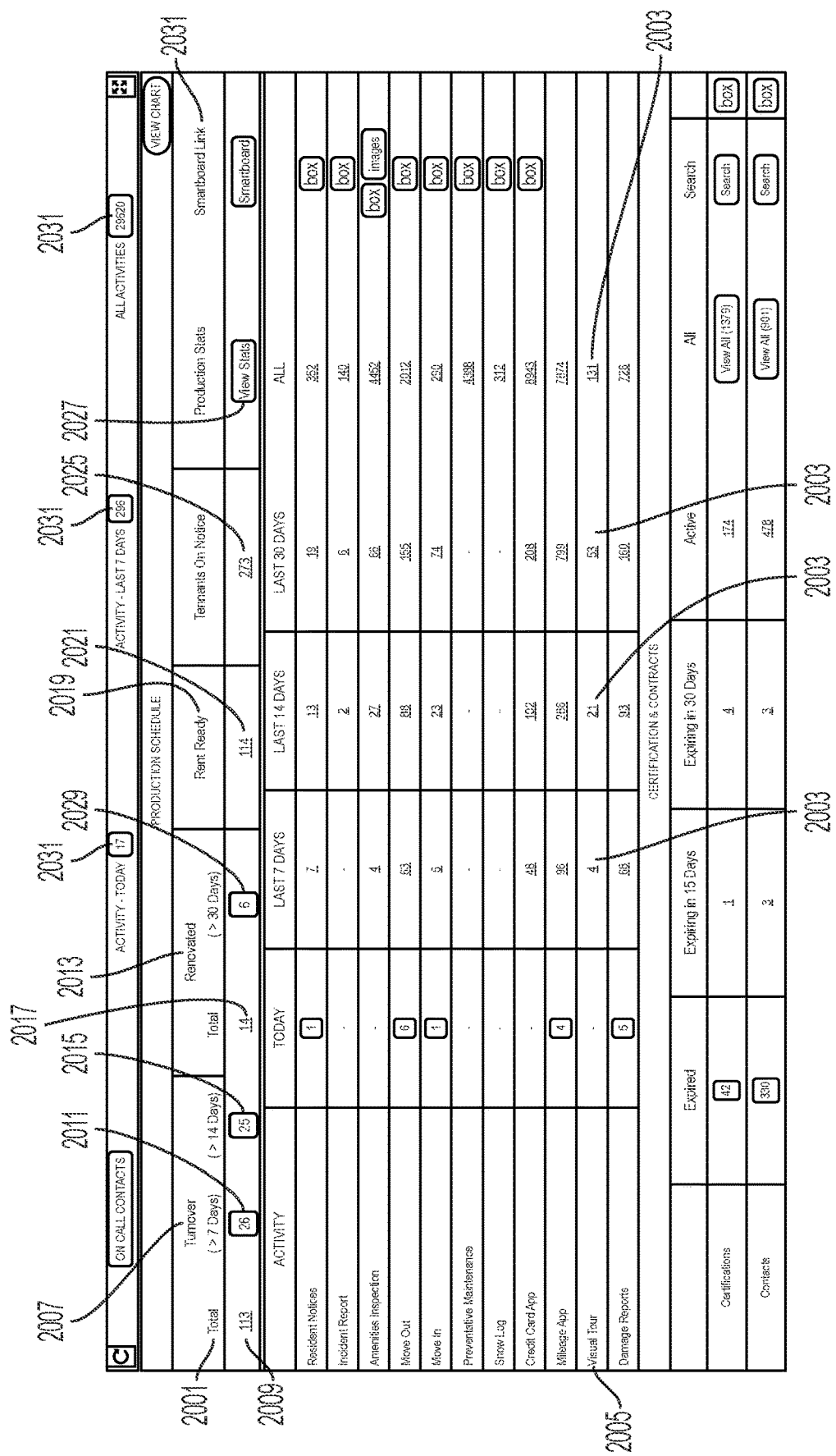
FIG. 20 is a screen shot of the production schedule dashboard according to one possible implementation.

Referring now to FIGS. 15 and 20, production schedule 73 of property management system 10 includes programming for optimizing its operations by processing of multiple property data records and displaying corresponding indicia for some or all of a plurality of multi-unit dwellings and their respective residential units. In one sense, as used in this disclosure, the term "production" with regard to residential units of multi-unit dwellings is similar in meaning to property management. Production may be understood generally to refer not only to the management of units, but particularly to those units in a state of transition, such as those being turned over through different phases of tenancy, whether associated with tenants on notice; tenants vacating units; cleaning, renovating, upgrading, or otherwise readying units for rent; advertising or marketing rent-ready units, and the like. In the illustrated implementation, data associated with a plurality of multi-unit dwellings, such as those under common ownership or management by a company or enterprise, may be displayed on, or selected from, an arrangement of various indicia and associated user-selectable fields, in which all such indicia for the multi-unit dwellings are displayed simultaneously on a single display screen, such as that shown on production schedule dashboard 2001.

The terms "single display screen," "simultaneously," and similar terms used herein with reference to programming to display user-selectable fields and indicia, is meant in its broad sense to include not only user-perceived content corresponding to a page or physical limit of the screen, but all data generated by a particular set of program instructions for display, even if such data are accessed by scrolling on or pagination of the displayed screen. As such, the term single display screen or simultaneous display refers to the programming construct rather than a physical arrangement, that is, it includes those indicia and field displays resulting from the programming for generating such indicia and fields, and which are displayable in response to a user selection or in response to associated system operations, irrespective of the physical dimensions of the graphical user interface, some of which dimensions may require scrolling or pagination.

Programming associated with production schedule 73 may display on dashboard 2001 data for a plurality of multi-unit dwellings in response to user selection of the production schedule (1502), or may be tailored to a sub-set thereof, either through preferences or further user selection. In any case, in response to user-selection, programming determines and retrieves for display various management information associated with the selected one or more multi-unit dwellings. Thus, for example, production schedule 73 has programming for selectively determining for multiple units of at least one of the multi-unit dwellings, a first set of the residential units comprising vacant units being turned over to become rent-ready, a second set of the residential units comprising units under renovation, and the third set of the units comprising rent-ready units (1501). The results of such determinations of first, second, and third data sets are displayed as user-selectable fields having indicia corresponding to the numbers of such sets (1503). Thus, for example, in the implementation shown in FIG. 20, vacant units in the process of being turned over are displayed associated with indicia "turnover" 207 including a user-selectable total number of vacant units 2009 being turned over to become rent-ready. Similarly, the second set of residential units comprising units under renovation are displayed in indicia 2013, including a total number of units user-selectable field 2017. The third set of residential units comprising rent-ready units are likewise determined and displayed in indicia 2019, including the user-selectable field 2021 indicating the total number of rent-ready units 2021 corresponding to the one or more multi-unit dwellings under management by property management system 10.

The programming steps shown in FIG. 15 are one suitable implementation for the determination of the three sets of units discussed above. In such implementation, in response to launch of the production schedule dashboard (1502), the determinations (1501, 1507) are made in real-time, such as by accessing current databases associated with system 10. One such database may comprise relational database 931 and involve determinations using unit status indicators (1520) of relational database 931. The various totals of the three sets may not only be displayed simultaneously in the form of user-selectable indicia of the real time determinations (1503), but likewise production schedule 73 may be suitably updated either upon launch of the dashboard (1502) or any suitable time thereafter (1505).

Operations of property management system 10 may be optimized by further processing property data records related to vacant, renovated, and rent-ready units, so as to generate exception reporting, that is, the programming indicates excessive time delays between the units being indicated as vacant or under renovation, and such same units becoming indicated as rent-ready. Such exception reporting may take the form of determining the number of units with the status of vacant, but which have not been indicated to be rent-ready for predetermined periods of time, such as a determination of the number of units which were turned over to vacant to rent-ready in an amount of time exceeding seven days and in an amount of days exceeding fourteen days (step 1507). The predetermined time delays, when referring to a vacant or vacated unit, may measure such delay in reference to the move-out date associated with such vacant unit, and a subsequent date, the subsequent date here being the user access and launch of the dashboard as of the current date. But the subsequent date and associated units exceeding the predetermined time delay may also be another date, such as the date of completed renovation or the rent-ready date, as discussed previously. User-selectable indicia 2011, 2015 correspond to the number of units turned over from vacant to rent-ready in greater than seven days or greater than fourteen days, respectively.

Further programming operations relating to production schedule 73 cause display of indicia identifying each of the residential units of the respective first, second, and third sets of residential units, corresponding to vacant, renovated, and rent-ready, upon selection of user-selectable fields 2009, 2011, 2015, (for vacant units), 2017 (for renovated units), and 2021 (for rent-ready units). Simultaneously determined and displayed along with the first, second, and third sets of units discussed previously, indicia 2025 are displayed and correspond to the total number of tenants on notice across one or more of the multi-unit dwellings.

In addition to the processing and display of data and fields in production schedule dashboard 2001, user selection of a production statistics field 2027 generates and displays additional property management statistics related to that displayed on dashboard 2001. The ability to access and display such additional statistics through the simultaneously displayed production statistics field 2027 on dashboard 2001 makes system 10 more readily operable and user friendly. Production statistics may be determined by the programming by at least one time period, preferably over a series of months preceding the current date or a selected date, thus giving a historical assessment of statistics for turning apartment from move-out or vacant condition to renovated or rent-ready condition. As such, determinations during selected time periods may include a total-unit turnover per multi-unit dwelling corresponding to the number of units of such multi-unit dwelling turned over from vacant to rent-ready, and average number of days associated with the total-unit turnover number, a total-unit renovation number corresponding to the number of units renovated to become rent-ready, and an average number of days associated with the total-unit renovation number.

Programming may display one or more of the foregoing determinations for one or more of the time periods in response to user-selection of the "View Stats" field 2027, one suitable form of such display appearing in FIG. 21 as a simultaneous screen of data 2102, showing six months of time periods and the associated production statistics determined by the system 10. Production statistics screen 2102 includes a unit total field 2101, corresponding to the total-unit turnover number, and a unit total renovation field 2103, corresponding to a total-unit renovation number 2103, for respective ones of the time periods, and for respective multi-unit dwellings. As such, user selection of the unit totals fields 2101, 2103 results in display of corresponding indicia, such as a listing, of the units previously determined by the system to correspond to the total-unit turnover number or the total-unit renovation number.

Referring again to FIG. 20, user-selectable field 2029 generates an exception report for units, the renovation of which has exceeded a pre-determined period of time, in this case greater than thirty days. In response to user-selection of field 2029, the units corresponding to conditions of having been vacated and subject to renovation for a period of more than thirty days are determined and suitable program instructions display renovation indicia and identify the subset of units under renovation associated with exceeding the time delay.

Other processing of renovated units is likewise contemplated, such as determining the average number of days of renovations by multi-unit dwelling (step 1509, FIG. 15) and displaying a pie chart of the average days of renovations by respective ones of the multi-unit dwellings. Such pie chart may likewise include indicia showing those units which exceeded a predetermined number of days, such as thirty days, and such units may be grouped into a red zone or similar identifying indicia on the display pie chart. Each of the segments of the pie chart may comprise user-selectable fields which, in response to selection, display a listing or other corresponding indicia of the members composing the pie chart segment, including those renovations that occurred beyond the predetermined number of days in the red zone.

Figure 22:
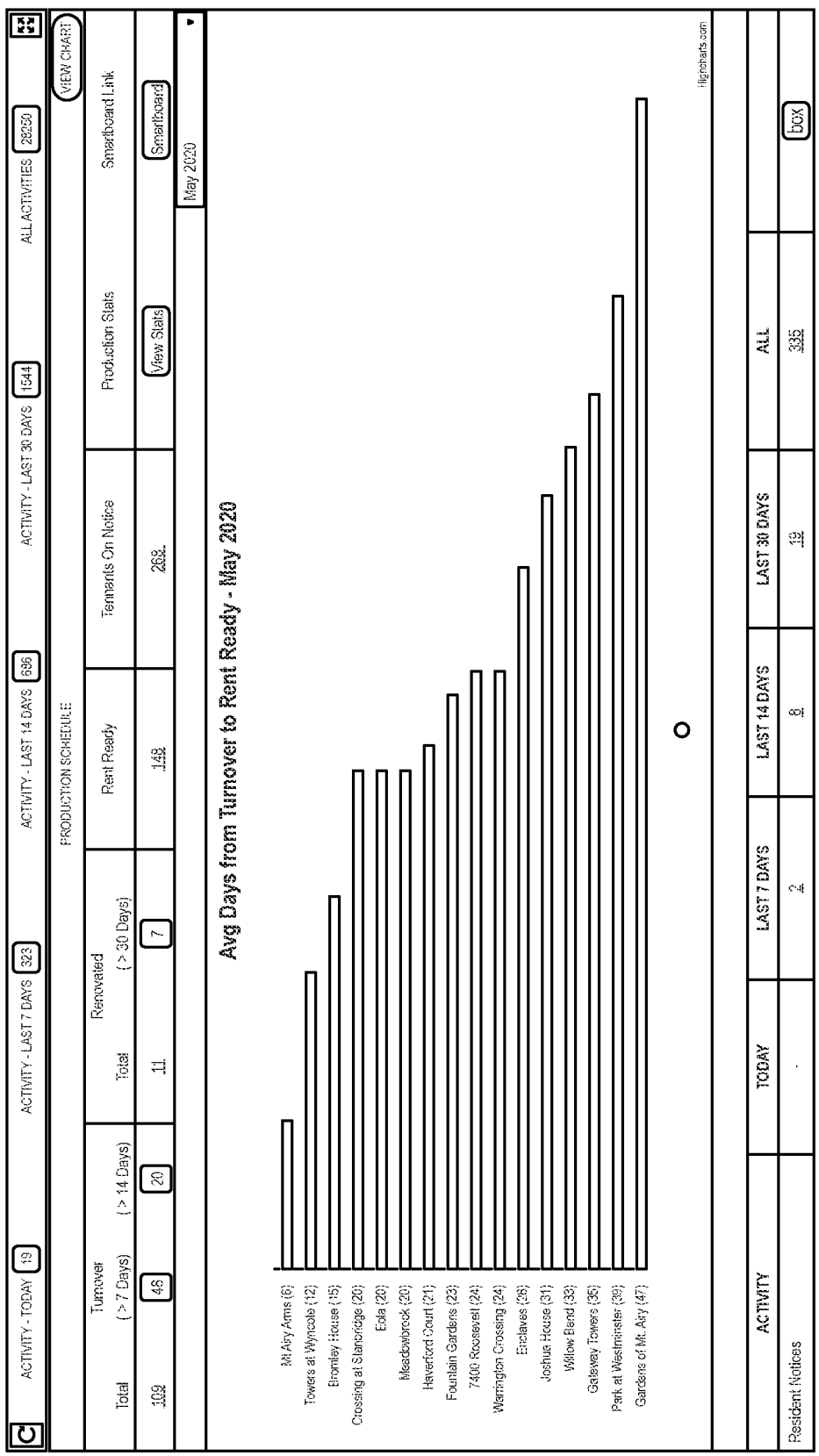
FIG. 22 is a screen shot of indicia in the form of a bar graph generated by suitable programming associated with the production schedule.

Still further optimization of rental unit turnover by property management system 10 may be accomplished by determining the average number of days from turnover to rent-ready for a selected time period and for a plurality of residential units in a plurality of multi-unit dwellings (step 1508, FIG. 15). Executable program steps may also display the average number of days determined in the foregoing step as a bar graph, accessible from the production schedule dashboard 2001, with each of the bars corresponding to a respective one of the multi-unit dwellings, and with the bar arranged in an order of ascending or descending number of days corresponding to the average days of turnover for such multi-unit dwelling, such as that shown in FIG. 22. As with other displayable indicia discussed herein, each of the bars is associated with user-selectable fields for displaying further data taken from property records of the units associated with each of the multi-unit dwellings depicted on the bar graph (1510). The programming may likewise have a selection field for generating the average number of days of residential unit turnover for multiple, multi-unit dwellings for any preceding month, year, or other time periods, and generating and displaying a corresponding bar graph display.

User operation, ergonomics or user-friendliness associated with property management system 10 are likewise enhanced by programming that simultaneously displays on the production schedule dashboard 2001 a user-selectable smartboard field 2031, and further including associated instructions for displaying the smartboard in response to user-selection of the smartboard field 2031.

Similarly, efficiency is promoted by programming capable of displaying, simultaneously with the production schedule dashboard 2001, user-selectable fields and indicia corresponding to data associated with the certificates and contracts subsystems 27, 29. As such, a certifications/contracts dashboard 2033 may display data determined by the respective subsystems 27, 29, such as determining and displaying total active, expired, and soon-to-expire certifications and contracts. The certifications/contracts data determined and displayed in dashboard 2033 includes corresponding user-selectable fields and programming capable of displaying, in response to user-selection, corresponding lists of the multi-unit dwellings associated with the active, expired, or soon-to-be-expired certifications and contracts.

Stale Apartment Subsystem

Figure 16:
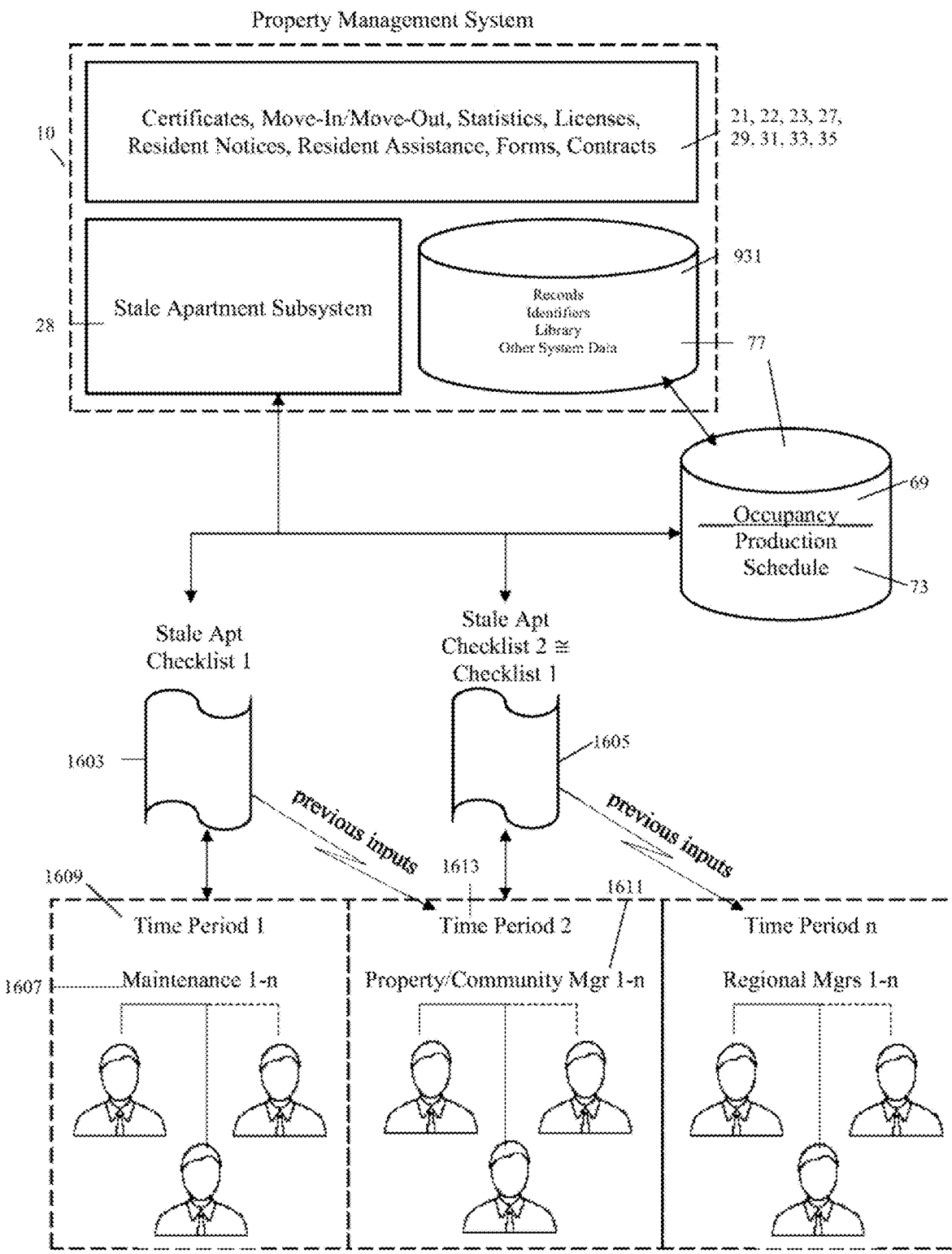
FIG. 16 is a program structure schematic of a stale apartment subsystem according to one possible implementation disclosed herein'
Figure 17:
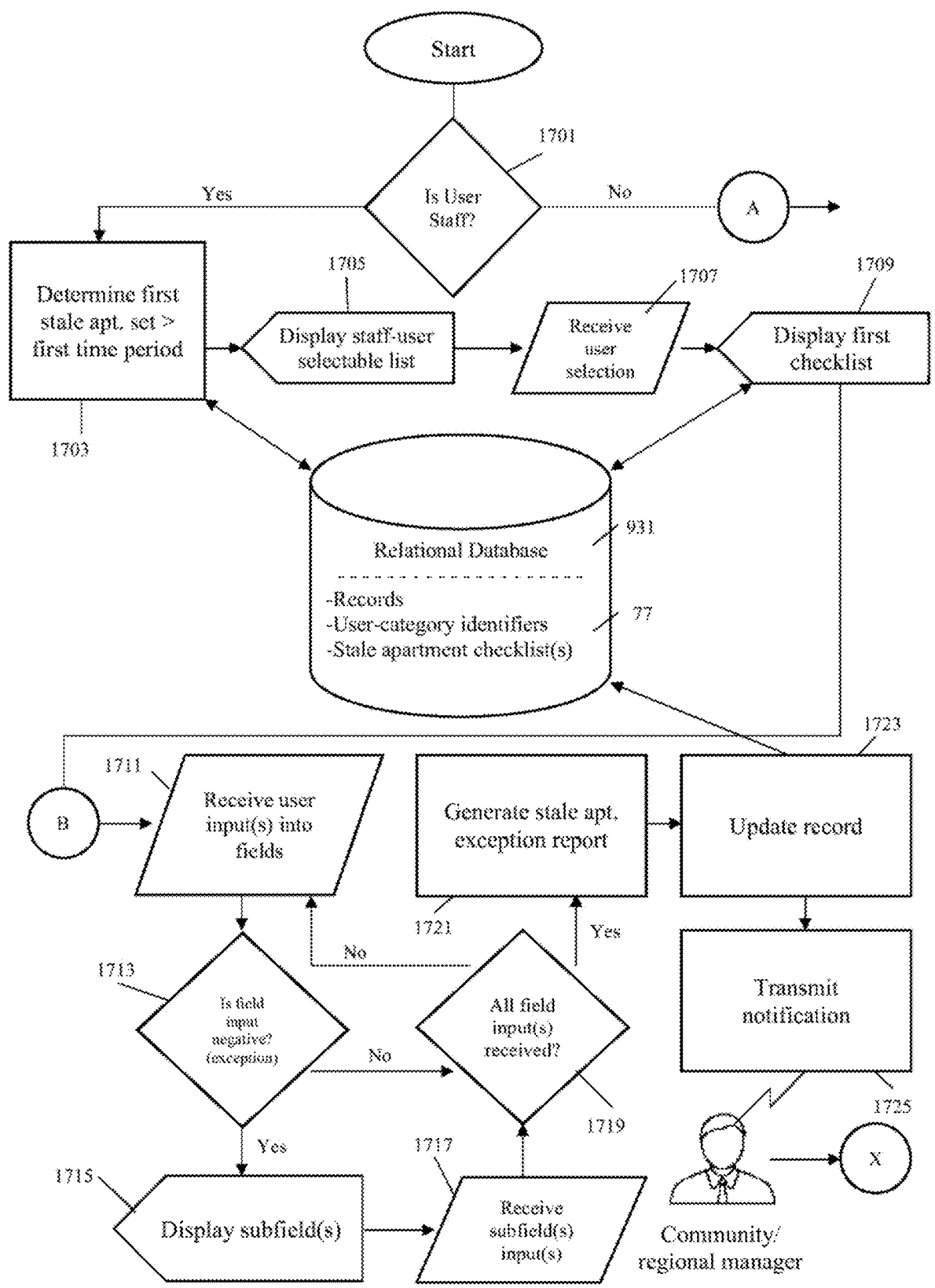
FIGS. 17 and 18 are flow charts of possible programming of the stale apartment subsystem of FIG. 16.
Figure 18:
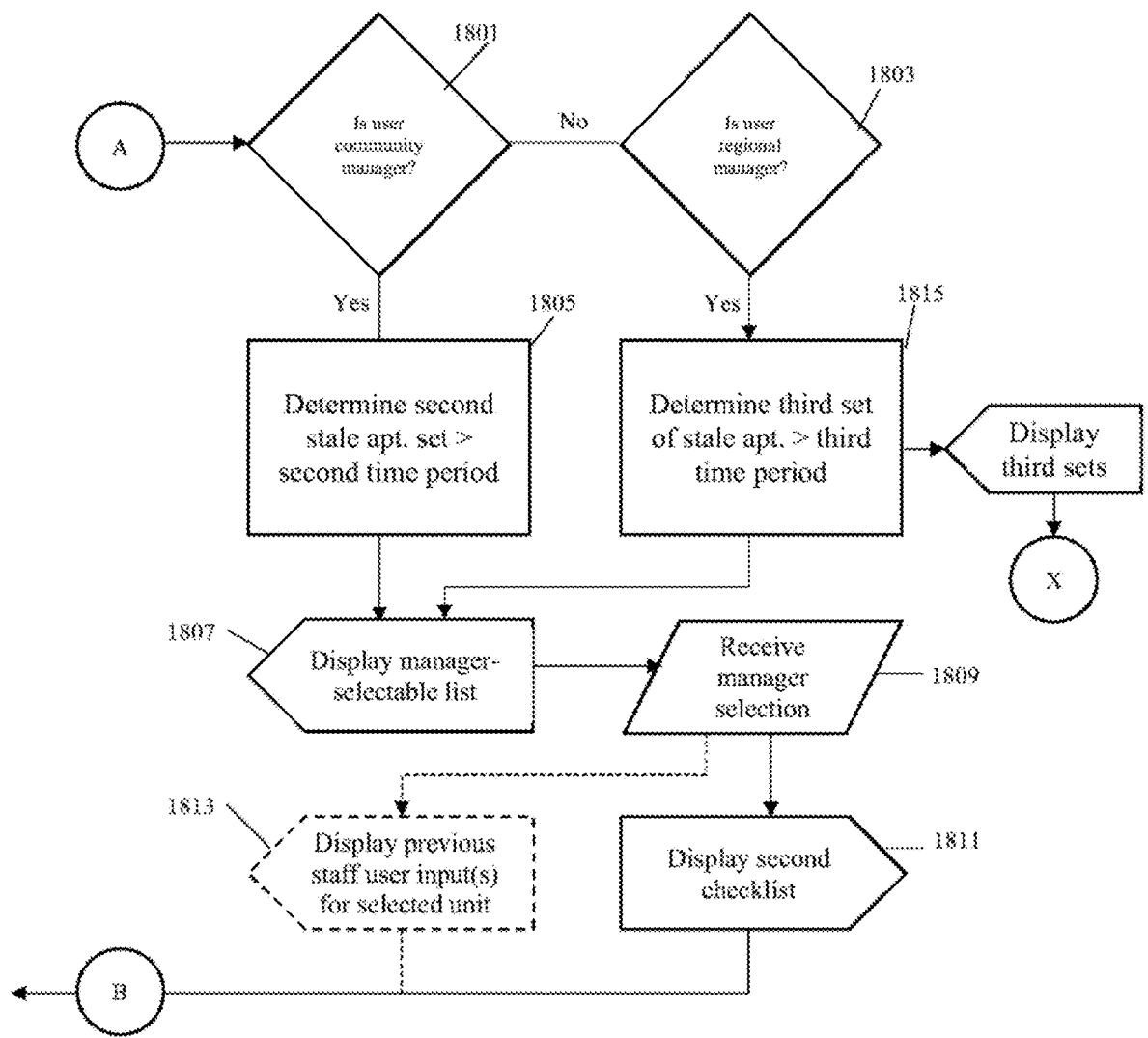

Property management system 10 may make use of rent-ready occupancy identifiers and other associated data from the property data records of relationship database 931 in connection with a stale apartment subsystem 28 shown schematically in FIG. 16, and described in reference to one exemplary workflow shown in FIGS. 17 and 18. Programming and workflows associated with stale apartment subsystem 28 improve management of residential units which remain unrented beyond one or more predetermined time periods, as measured from a current date or any other appropriate date of inquiry. As such, stale apartment subsystem 28 accesses data from any suitable database associated with property management system 10, whether it be relational database 931, including various identifiers associated with property data records therein; library 77 associated with templates, checklists, or other data; databases associated with statistics subsystem 33, the accounting function 71, or databases storing occupancy related data 69, as well as databases of production schedule 73.

Occupancy status identifiers useful to stale apartment subsystem 28 include identifiers in the property data records corresponding to a rent-ready identifier, namely residential units available for rent. Stale apartment subsystem 28 may make use of user-category identifiers to make available certain processes to a certain category of users and not others. Thus, for example, in workflows associated with stale apartment subsystem 28, maintenance users and staff, property or community manager users, and regional managers may each have corresponding user identifiers which will be factored into workflows, as explained subsequently.

In one possible implementation, stale apartment subsystem 28 has programming for recording the date that a selected unit is accorded the rent-ready occupancy status indicator and then generates workflows keyed off of such rent-ready status date, depending on the period of time that such rent-ready apartment remains unrented. Thus, when a user starts or launches stale apartment subsystem 28, if programming determines such user is a maintenance or other staff user (1701, FIG. 17), then subsystem 28 determines of a first stale apartment set (1703) which has been rent-ready but unrented for an amount of time greater than a first time period 1609, such as 30 days in this implementation, and generates a corresponding displayable and selectable list for such first set of stale apartments (1705). Programming receives a selection (1707) of one of the units identified in the displayed stale apartment listing. In response to such selection, a first checklist 1603 is displayed for such staff or maintenance user or other staff user. (1709). The displayed checklist 1603 is specifically associated with responsibilities and tasks relevant to either the maintenance or staff user 1607 and/or the first predetermined time period 1609. As such, one or more maintenance or staff users may access stale apartment checklist 1603.

The predetermined user input fields for the first checklist 1603 may include questions designed to double check or otherwise verify data previously inputted, such as may be generated during a move-out inspection. For example, one of the questions in checklist 1603 may be whether the apartment is occupied, which would not necessarily be consistent with the occupancy status of vacant recorded previously for the selected unit. Such system thus may detect holdover tenencies or sublets which might otherwise be more difficult to detect by operation of property management system 10.

Still further programming generates user input fields and receives user input therein (1711), such fields relating to the cleanliness of the apartment, including particulars such as insects in light fixtures, window sills, appliances, or cabinets, issues with bathroom fixtures, tile grout, and other services which should be clean, clear and sparkling, and likewise for kitchen and its appliances, tiling, and fixtures. Still further questions may relate to the appearance of carpeting, including just vacuumed lines which may have appeal to prospective renters, and questions regarding smells, cigarette odor, pet odor, unwanted mildew or moisture smells, noise, and other factors. These factors may be categorized as first-level, physical, or cleanliness factors, and other factors which are within the realm of responsibility of the maintenance or other staff, as they may be addressable by cleaning and other activities within the staff responsibilities. As such, stale apartment subsystem programming organizes staff work responsibilities so as to address stale apartments, reminds them of the different aspects of maintenance and cleaning tasks, and provides work flow and record keeping capabilities which may enhance overall management functions of property management system 10.

Suitable programming determines whether user input into a respective one of the fields on checklist 1603 is negative (1713), that is, an exceptional condition is identified, such as dirt, noise, smell, and the like. In the event of such a negative or exception being determined, suitable programming displays subfields or other prompts to the user and requires input into such subfields (1715). Such subfields may comprise digital files corresponding to pictures taken by the maintenance or staff person identifying the exception by photographing with a smartphone (1717). Once stale apartments subsystem 28 determines all input fields have been completed and input received (1719), a stale apartment report is generated (1721), including indication of any exception conditions as noted above. Thereupon, appropriate records, including property data records, are updated (1723), and a notification that such stale apartment report has been generated is transmitted (1725) to a community manager and/or a regional manager. Such operations conclude the workflow and responsibilities associated with a maintenance or other staff user under this implementation of stale apartment subsystem 28. The community and/or regional manager, upon receipt of the notification of a stale apartment report, may act to assure exceptions reported or addresses or may take any other suitable management activity with regard to data received through system 10.

In addition to the programming of staff workflow of FIG. 17, community (that is, property) managers of a multi-unit dwelling 1611 and regional managers 1613 may benefit from additional programming and functionality of stale apartment subsystem 28. For example, suitable programming determines whether the user is a staff, community or regional manager (1701, 1801, 1803), and then makes available additional program features. More particularly, in the event the user is a community manager 1611, programming determines, generates and displays a user selectable list of a second set of stale apartment units (1805, 1807), which have remained rent-ready but unrented for a second time period, such second time period being greater than the first time period associated with the maintenance or staff user, such as 60 days.

As in the staff user case, in response to manager selection of a stale apartment from the second set (1809, a checklist is generated and displayed (1811), but in the case of the manager, such checklist comprises a second checklist 1605 (FIG. 16) which includes user input fields which are not equivalent to the set of input fields associated with the first, staff-user checklist 1603. For example, the user input fields in the manager checklist 1605 may relate to actions within the responsibilities in workflow of such property or community manager, such as decisions relating to price adjustments, rebates, concessions, advertisements, and other available actions within the community manager's purview.

In one possible variation, in addition to subsystem 28 displaying the second checklist (1811), the manager may receive the data inputted by the previous maintenance or staff user into checklist 1, and such inputs may be displayed in conjunction with the second checklist (1813). Management input is received by subsystem 28 in a manner similar to that discussed previously with respect to the maintenance or staff user shown by the flow chart branch B in FIG. 18, returning to the corresponding location B in FIG. 17. Accordingly, upon completion of the inputs into stale apartment checklist 1605, a stale apartment exception report may be generated, records suitably updated, and regional or other higher level management may receive a notification transmitted by the system such that such higher level managers may take suitable action.

Finally, in another possible implementation, a third set of stale apartments may be generated (1815) and displayed with units exceeding a third, predetermined time period even greater than the second time period, such as ninety days, and such third set of stale apartments might be associated with the regional manager (1815. A checklist for the regional manager with questions appropriate for mid- or higher-level management may be generated using programming similar to that discussed with regard to the community manager (1807, 1809, 1811).

As seen in FIG. 16, such regional manager may receive previous inputs not only from the property community manager, but also from the maintenance or staff user in the previous time periods one and two. Furthermore, the regional manager may likewise be shown a stale apartment checklist upon access of subsystem 28 which only displays stale apartments whose time unrented exceeds the third predetermined time period, such as ninety days or longer.

Front-End Modules

Figure 23:
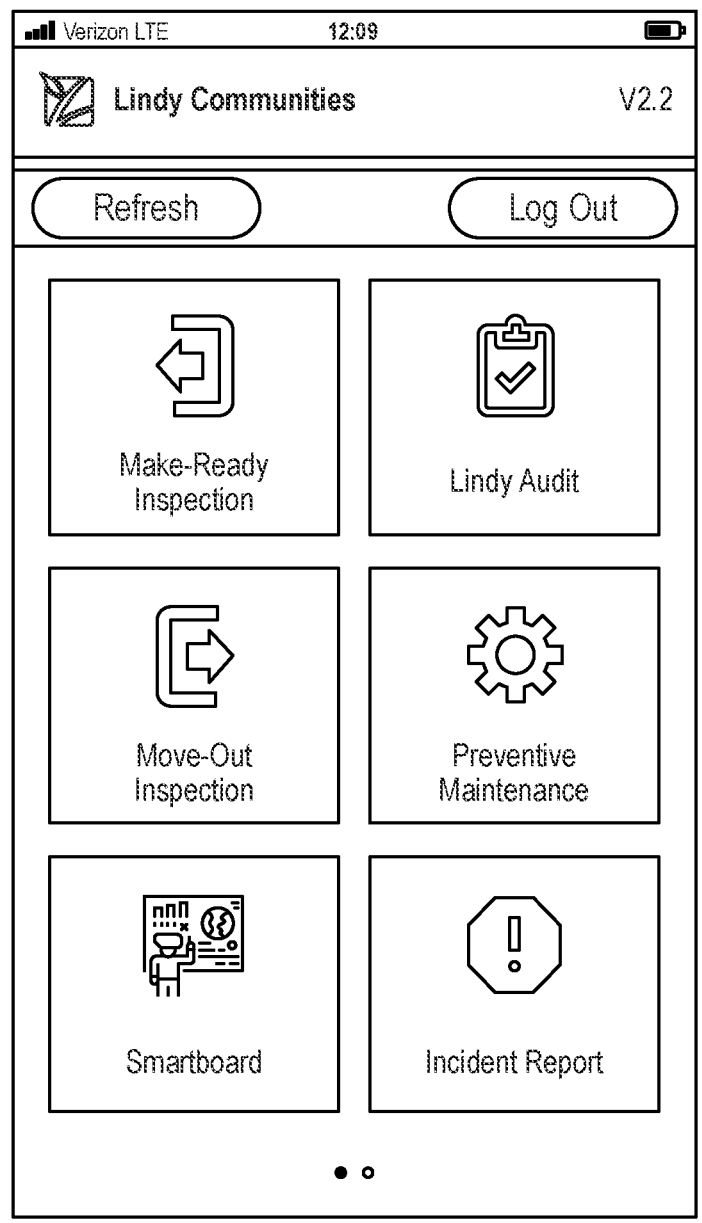
FIGS. 23 and 24 are screen shots of user-selectable fields for launching front-end modules of the property management system according to one possible implementation.
Figure 24:
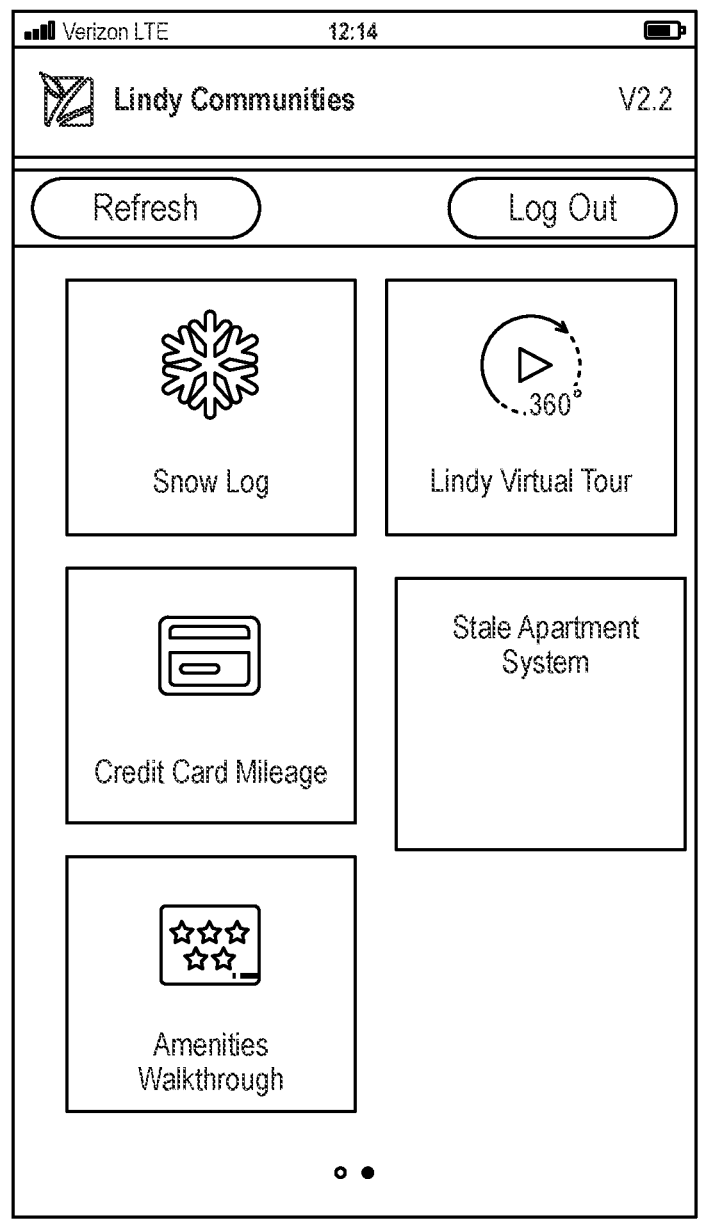

It will be appreciated that the various programming modules and subsystems described herein may reside either in a server or other central location or some or all of the functionality may be distributed to clients, including programming and graphical user interfaces on personal electronic devices, and it is to be understood that variations of where functions are located and whether they are physically or logically deemed to be within the back end of the system or the front end of the system are included within the spirit and scope of this invention. To that end, in one possible implementation, access to system 10, including move-in/move out subsystem 21 and stale apartment subsystem 28 may be programmed to occur through a graphical user interface located at a front end, such as with a Smartphone app. Some or all of the programming associated with the functions may be at such front end or such functions may be merely activated through such graphical user interface and resident in the back end of the system 10. To that end, the move in/move out subsystem 21 may be accessed through front-end modules appearing on a graphical user interface of a personal electronic device, such as that shown in screenshots of FIGS. 23 and 24, including user selectable buttons for actuating programming for the amenities walk-through, the make-ready inspection, the move-out inspection, the preparations of the visual tour, or access to a smartboard displaying processed data as shown and described with reference to FIG. 11 herein.

Property management system includes additional modules accessible through the front end, and such modules are well suited for location on a personal electronic device, as they relate to personal activities associated with managers and other staff using property management system 10. Thus, for example, front end modules may be accessed through user selectable buttons shown in FIGS. 23 and 24, with functions corresponding to generating an incident report, such as through the resident notice subsystem 22 or a form through the forms subsystem 23, or an activity log for snow removal operations or entering reimbursable mileage accrued to credit cards, as seen by corresponding user selectable buttons in FIG. 24.

Activity Logs

Figure 25:
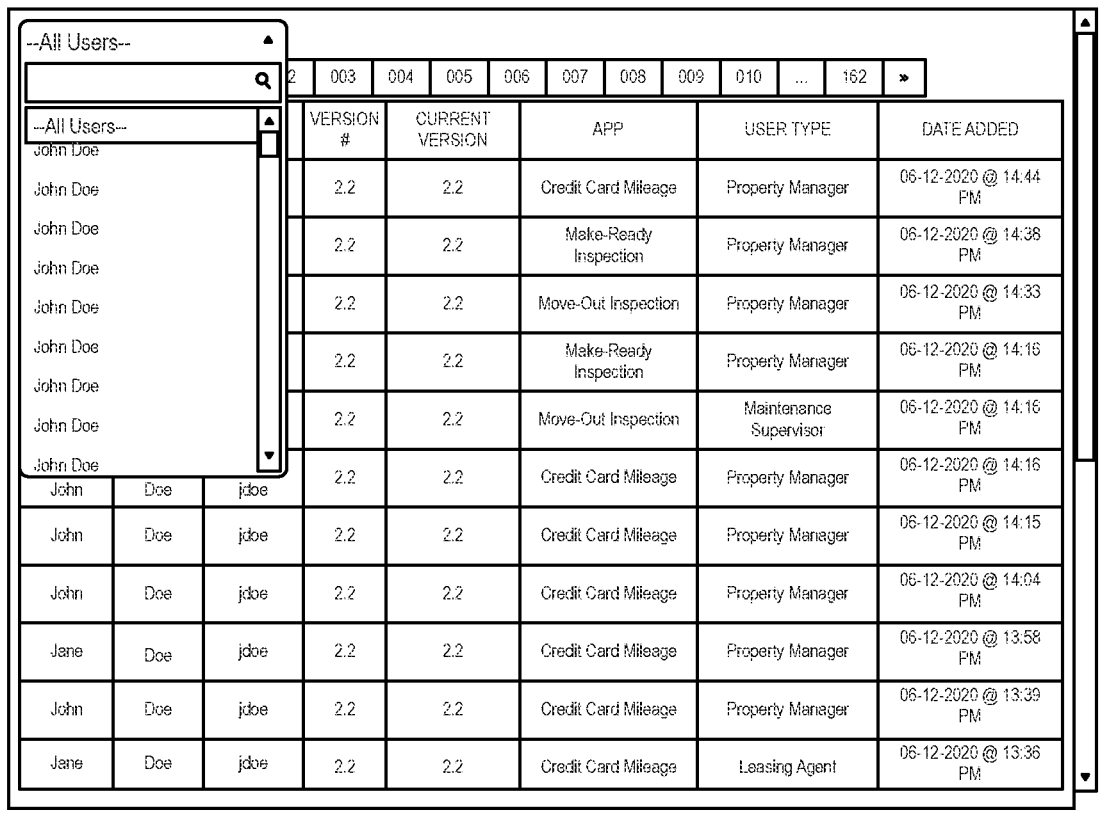
FIG. 25 is a screen shot generated by suitable programming for generating activities logs.

Returning to the production schedule dashboard 2001 of FIG. 20, suitable programming displays one or more user selectable buttons 2031 for generating activity logs. Generation of such logs involves programming to determine activities performed by one or more users of the system during corresponding to time periods relevant to management of staff and other users of the system, such as activities logged for the current date, activities logged in the last seven days, or all activities during a fiscal year. Programming determines numbers of activities associated with the time periods of respective buttons 2031 and, upon user selection of a respective button 2031, the activities associated with the totals as determined by the programming are displayed in more detail. Such display may comprise activity logs or charts showing the user, the activity associated with such user, the date of user data entry, and other suitable details drawn from user updates and entries into databases associated with property management system 10 herein. One suitable determination of activity records and associated display thereof is shown as a pop up window in FIG. 25 herein.

The activity programming and associated determinations may include searching of the relational database to determine which of the property data records have been subject to user update during a selected period of time, sorting the determined records by type of user update when the user updates are associated with operations of various subsystems of the property management system. So, for example, the activities functions of system 10 may process, sort, and display user updates relating to move out inspections, make ready inspections, and visual tour creations. Programming may be associated with the activities logs so that any reports associated with inspection activities may be linked or otherwise accessible from the listing generated in FIG. 25. Similarly, digital video files associated with the visual tour may be reviewed and analyzed through activities log programming.

Contracts and Licensing Subsystems

Property management system 10 includes user-selectable panel options 123 to access, launch or otherwise initiate further property management subsystems than those described above, such as licenses subsystem 31 and contracts subsystem 29 as shown by indicia appearing in panel options 123, such subsystems shown schematically in FIG. 2. Similar to certificate subsystem 27, license subsystem 31 and contract subsystem 29 can receive property manager input through input fields 249, and thereby generate, sort or filter records, and store them in a suitable database, such as library 77 or networked or otherwise remote database resources 79, 81 (FIG. 1).

For contract subsystem 29, programming receives user input into suitable templates, user-selectable fields, or cells in spreadsheets, corresponding to one or more of the multiple unit dwellings, and comprising data entry fields which correspond to a contract account number, a contract type, a building, an origination date, a termination date, a renewal date, and a contact person. User input is associated with contract record identifiers to create the contract records in library 77 of system 10 or in other suitable database, and the identifiers in conjunction with the data associated with such identifiers permit subset generation 255 and sorting/filtering of records 253 (FIG. 2) as well as general access and other processing functions associated with records having field identifiers associated therewith.

Similar to the programming described with relation to certificate subsystem 27, contract subsystem 29 and license subsystem 31 can automatically or selectively determine one or more status indicators 251 for the contract records in this system having termination date fields inputted, contract status indicators relating to upcoming or actual expiration of contracts. Suitable status indicators can be devised for the contracts within the system and can include color indicia of green, orange, yellow, red, blue, and brown, corresponding to statuses of good, 30-day-to-expiration, 60-day-to-expiration, expired, replaced, and updated inspection, respectively, similar to those related to the certificate subsystem 27. Programming can be provided for sorting and filtering by color indicators or if not present, by status indicators. Subsets of one or more of the contract records may be generated, whether by status indicator, or by other data input field or identifier, such as the contract type, building, or contact person.

The foregoing discussion of certificate subsystem 27 and contract subsystem 29 applies with regard to the programming for license subsystem 31. The instructions for license subsystem 31 generate suitable input field 249, status indicator 251, sorting and filtering capabilities 253, and subset generation 255, handling records associated with licenses so that they can be processed and suitably analyzed separate from certificates or contracts.

Statistics Subsystem

Property management system 10 includes suitable programming to generate statistical outputs through statistics subsystem 33, by processing fields and identifiers of resident notice records, resident assistance records, move-in/move-out records, certificate records, contracts record, and license records. Processing of one or more of the foregoing categories of records may generate any number of visual outputs, such as a pie graph, a bar graph, or listings on a graphical user interface and such outputs can be further sorted or tailored in order to assist property managers 55, regional managers 57, or other personnel associated with management of multiple-unit dwellings 51. As just one example, the statistical outputs may comprise pie graphs of certificate records grouped by status indicator, and may include suitable programming for generating percentages for display so as to indicate what amounts of certificates are within particular status categories and might require attention.

Resident Assistance Subsystem

Another aspect of property management system 10 relates to optimizing or more efficient management of assistance to residents of MUDs 51, when such residents are physically challenged, disabled, have other disabilities. Also, some residents may have statuses entitling them to certain services, such as a veteran's status and associated support for such veterans. Resident assistance subsystem 35 includes suitable programming to perform such functions. In one possible implementation, user input is received by resident assistance subsystem 35 through resident assistance fields in a template displayed on a graphical user interface, such input relating to limitations, disabilities, veteran's status, and other special needs of the residents which require coordination, scheduling, or involvement by management personnel for the MUDs 51. Suitable programming in the form of a resident assistance engine may then selectively access the records of residents requiring assistance as previously generated in step 257, such resident assistance engine 259 having functions to permit scheduling of disability accommodations, transportation, and even accessing care providers 49 to arrange appointments, home visits, and other services associated with infirmities, limitations, retirement, disabilities, or veteran's status. As just one example, the resident assistance engine 259 may be suitably configured to transmit an electronic notification to a portable electronic device remote from the graphical interface of the property management subsystem 10 and accessible to the aforementioned care providers, and also accessible to transportation personnel for the disabled, or veteran's benefits coordinators.

Forms Subsystem

The form builder subsystem 23 allows management of more routine interactions between property management managers 55 and residents 53 of MUDs 51. Some of the interactive functions that can be handled through form generation, transmission, and return may include parking permit forms, physical assistance during exiting, bike registration forms, goodwill concessions to residents, customer care cards, soliciting input relating to incidents, forms relating to setting up resident accounts, rent credit forms, replacement key forms, and any number of surveys. Form builder subsystem 23 may include subroutines or modules that enable property managers 55 to "build" forms, that is, create electronic templates to be used in any of the foregoing interactions with residents 53, or to devise new ones as required.

As such, a tenant form library having multiple tenant forms related to the property management of MUDs 53 may be suitably stored and accessible, updatable, and sortable. The tenant form library, when accessed and displayed, may have tenant input fields for receiving input not necessarily from property managers 55, but from residents (tenants) 53. The forms having fields for tenant input may also include tenant selectable links. A user such as a property manager 55 may build a form or generate a form from the existing tenant form library and associate it with a particular tenant to receive the tenant form. So, for example, in the case of needing a bike registration, a communication is generated consisting of a tenant form with text inviting the tenant to complete a bike registration form.

The system generates a template or form letter, but the form letter has fields for displaying input from property managers in predefined areas to create a personalized communication to the tenant by name, but likewise has unalterable portions (similar to the resident notice subsystem 22), which may relate to an explanation or the purpose of the selected form. In one possible operation, a forms menu is displayed showing all of the available forms to a user such as property manager 55, and the property manager is able to select from the menu an appropriate one of the multiple tenant forms available. The intended recipient of the form is populated in the appropriate fields when the selected form is displayed for the property manager 55.

In the case of emailing the tenant form, the communication may include a link embedded within the communication to enable the tenant to selectively access the corresponding form which the resident manager has invited the tenant to complete and return. The system enables linking to the selected one of the tenant forms, and such tenant forms may be either stored within library 77 or any of the other data sources 79, 81, or may transfer the tenant to any third party website. In the case of a tenant form stored within property management system 10, suitable programming enables electronic input by the tenant into the tenant form to create a completed tenant form and, thereafter, the system is programmed to enable electronic receipt of the completed tenant form. Given that form builder subsystem 23 may be selectively accessed by tenants or tenant forms, in one implementation as shown in FIG. 1, a firewall insulates form builder subsystem 23 from other functions of property management system 10.

To assure smooth processing of routine communications through form builder subsystem 23, functions may be programmed to record the date that a property manager 55 generates the particular communication to the tenant, may generate a follow-up date to such communication, and may determine when the follow-up date is close or has arrived, and communicate a reminder to either the property manager to follow-up, to instruct the tenant to return the form, or both.

Forms subsystem 23 may likewise include forms which permit transmission to medical professionals, such as a pet owner form seeking vaccination information from a veterinarian. Forms may be sent to residents for completion, and such residents in turn, may electronically transmit forms upon completion to a third party and make use of electronic document signature programs or other functionality to get the document signed and returned by the third party to the resident, in turn having such signed form returned to the resident manager, all through various programming of form building subsystem 23. As another example, in the event special access, medical or other special accommodations require physician sign-off, forms subsystem 23 may function as described above to permit generation, transmission, or return of relevant forms, signatures, information, and the like. Current or prospective residents may likewise be provided access to subroutines with forms subsystem 23 to forward or distribute lease or other occupancy related documents for signature or completion by co-tenants, occupants, roommates, etc., and to track the return of such documents.

Computer System Hardware and Software

System 10 may be implemented on any suitable computer platform, using either stand-alone or networked architecture. In one version, there may be one or more of the subsystems 25 stations in communication with a database or other data storage means, one or more servers or processors, either through a local-area or wide-area network. A client-server architecture using the world-wide web may also be used. In the event computer work-stations are involved, whether as stand-alone versions of system 10 or as housing subsystems 25, such workstations may comprise a computer system which includes a processor (e.g., a central processing unit (CPU), a graphics processing unit (GPU, or both), a main memory and a static memory, which communicate with each other via a bus. The computer system may further include a video display unit (e.g., a liquid crystal display (LCD), a flat panel, a solid state display, or a cathode ray tube (CRT)). The computer system may include an input device (e.g., a keyboard), a cursor control device (e.g., a mouse), a disk drive unit, a signal generation device (e.g., a speaker or remote control) and a network interface device.

The disk drive unit may include a machine-readable medium on which is stored one or more sets of instructions (e.g., software) embodying any one or more of the methodologies or functions described herein, including those methods illustrated above. The instructions may also reside, completely or at least partially, within the main memory, the static memory, or within the processor, or a combination thereof, during execution thereof by the computer system. The main memory and the processor also may constitute machine-readable media.

Dedicated hardware implementations including, but not limited to, application specific integrated circuits, programmable logic arrays and other hardware devices can likewise be constructed to implement the methods described herein. Applications that may include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the example system is applicable to software, firmware, and hardware implementations.

In accordance with various embodiments of the present disclosure, the methods described herein are intended for operation as software programs in the broad sense to include, without limitation, computer coding, microcode, firmware, or other programming, such software running on a computer processor or other microprocessor. Furthermore, software implementations can include distributed processing or component/object distributed processing, parallel processing, or visual machine processing can also be constructed to implement the methods described herein. The instructions may further be transmitted or received over the communications network via the network interface device.

While the machine-readable medium is in the singular, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that cause the machine to perform any one or more of the methodologies of the present disclosure.

The term "machine-readable medium" shall accordingly be taken to include, but not be limited to: solid-state memories such as a memory card or other package that houses one or more read-only (non-volatile) memories, random access memories, or other re-writable (volatile) memories; magneto-optical or optical medium such as a disk or tape; or other self-contained information archive or set of archives is considered a distribution medium equivalent to a tangible storage medium. Accordingly, the disclosure is considered to include any one or more of a machine-readable medium or a distribution medium, as listed herein and including art-recognized equivalents and successor media, in which the software implementations herein are stored.

The illustrations of arrangements described herein are intended to provide a general understanding of the structure of various embodiments, and they are not intended to serve as a complete description of all the elements and features of apparatus and systems that might make use of the structures described herein. Many other arrangements will be apparent to those of skill in the art upon reviewing the above description. Other arrangements may be utilized and derived therefrom, such that structural and logical substitutions and changes may be made without departing from the scope of this disclosure. Accordingly, the specification and drawings are to be regarded in an illustrative rather than a restrictive sense.

In addition to the advantages apparent from the above description of property management system 10 and its various subsystem 25, one of the advantages of property management system 10 is that, on the one hand, the system includes a programmed series of screens for user input, which assures that all required information relating to a management function has been received and recorded into the system. On the other hand, the input guided by the programmed screens into the standardized templates has built-in options and flexibility so that, while the programming guides users to input required information, they may nonetheless select from menus or prompts which input is most appropriate for the particular circumstances. In this way, management of multiple unit dwellings is both standardized and made more comprehensive by requiring certain types of inputs, and yet may be particularized. The result is a more optimal and better tailored set of workflows for a defined set of property management functions.

Another advantage to system 10 is the time savings for property managers to readily see work, forms, notices, and other communications which do not require the user to "start from scratch," but yet allow the user to customize as needed.

Still another advantage is that the unalterable fields of text associated with communications with residents 51 establish a consistent tone, depending on the severity of the situation and other factors, so that, regardless of which resident manager may be generating the communication, the "voice" of the community is consistent. So, for example, given that it is often desirable to project a welcoming positive tone to residents, notice templates and other communications within the system may be written with that in mind to be used by the entire set of property managers, resulting in conveying the same warm, welcoming tone. Conversely, in the event of serious breaches or other troublesome aspects of property management, an appropriate legal tone may be created and used consistently.

Another of the many advantages to the system is assuring and optimizing compliance with any number of certificates, licenses, inspections, ADA, or other requirements, as deadlines, expiration dates, and scheduling, have been automated.

These and other advantages may be apparent from the disclosure herein, and the claims appended below.

What is claimed is:

1. A system for managing multiple, real properties comprising a plurality of multi-unit dwellings, the system comprising:
   a central processing unit;
   a computer program stored in a computer readable medium;
   a graphical user interface having a user-viewable screen associated therewith; and
   a library of electronic files operatively associated with a relational database, wherein the electronic files include:
      property data having records corresponding to a plurality of multi-unit dwellings, a plurality of units in the multi-unit dwellings, and residents' names corresponding to respective ones of the units;
      a plurality of templates retrievable from the library to generate the records for the multi-unit dwellings, the templates corresponding to property management functions;
      the templates including notice templates corresponding to respective resident notices to be generated and notice components to be included in the notices; and
      wherein the notice components and the templates include notice identifiers to associate at least one of the notice components with one or more of the notice templates;
   wherein the templates include pre-determined user-selectable notice fields corresponding to at least some of the notice components; and
   wherein the programming includes executable instructions capable of performing the following computer-implemented steps:
      receiving user input to launch property management subsystems corresponding to the property management functions for any one of the multiple properties, the property management subsystems comprising: a residential notice subsystem, a certificates subsystem, a licenses subsystem, a contracts subsystem, a move-in/move-out subsystem, a statistics subsystem, and a resident assistance subsystem;
      displaying on the screen an electronic menu panel having menu options corresponding to respective ones of the multiple, property management functions associated with the electronic files;
      receiving user input corresponding to a selected one of the multiple property management functions;
      displaying a series of screens corresponding to the selected property management functions in a programmed order to establish a corresponding workflow for a user;
      displaying a first screen of the series, wherein the first screen has at least one user-selectable filter field;
      in response to user input associated with the filter field, filtering the property data to associate portions of the property data in the library with the selected property management function; and
      restricting display of a second, subsequent screen until input has been received corresponding to user selection of the at least one filter field;

wherein the property data records include a plurality of move-in/move out identifiers, the identifiers including a building identifier, an occupancy status identifier, and a unit identifier;

the move-in/move-out subsystem comprising computer programming with executable instructions capable of performing the following computer-implemented steps:

displaying a move-in/move-out template after user-selection of a selected one of the units;

generating and displaying condition report fields associated with the move-in/move-out template, the condition report fields corresponding to amenities of the selected one of the units, and receiving user inputs by means of the condition report fields;

associating at least one of the identifiers with the inputs to create a move-in/move-out record;

storing the move-in/move-out record in the relational database;

wherein the step of associating at least one of the identifiers with the inputs received to create a move-in/move-out record comprises the steps of (1) updating the occupancy status identifier to indicate a move-out condition; (2) if the selected one of the units has the status indicator in the move-out condition, enabling user-selection of programming to create a move-out report; (3) associating digital images of the amenities of the selected unit with the move-out report; and (4) updating the property data record of the selected unit to include the move-out report and the associated digital images.

2. The system of claim 1, wherein the step of generating the condition report fields includes the step of generating (1) condition report fields for amenities in the unit comprising carpeting, appliances, fixtures, doors, and closets; and (2) at least one repair/replacement indicator corresponding to one or more of the amenities.

3. The system of claim 2, wherein the move-in/move-out sybsystem includes computer-programming with executable instructions capable of receiving repair/replacement input corresponding to the at least one repair/replacement indicator and, in response to receiving the repair/replacement input, generating a corresponding repair/replacement record and updating a computer-implemented production schedule of repairs or replacements.

4. The system of claim 3, wherein the computer programming comprises executable instructions capable of performing the computer-implemented step of transmitting, after generation of the repair/replacement record, an electronic notification to a portable electronic device remote from the graphical user interface of the property management subsystem, the portable electronic device being accessible to at least one of the group consisting of property maintenance staff and contractors.

5. The system of claim 1, wherein the step of associating the digital images comprises receiving the digital images from a portable digital camera.

6. The system of claim 1, wherein the system includes programming capable of displaying user-input fields in an ordered sequence corresponding to an associated promotional collateral work flow, the ordered sequence of the user-input fields including fields capable of performing the steps of:

a. receiving user inputs from a menu corresponding to selecting one of the plurality of multi-unit dwellings under management of the system and corresponding to selecting one of the units of the selected multi-unit dwelling;

b. receiving promotional user-input corresponding to the promotional collateral, the promotional user-input consisting of a digital video file of the selected one of the units, an opening card data file including displayable indicia for the selected unit, and a closing card data file including displayable contact information indicia for the selected unit, wherein the digital video file, the opening card data file, and the closing card data file together comprise visual tour data of the selected unit; and c. uploading the visual tour data to update the property data record of the selected unit; and wherein the system further includes programming capable of performing the step of displaying a user-selectable field corresponding to the visual tour data on a display-screen simultaneously with user selectable fields having programming associated therewith for categorizing multiple units of the multi-unit dwellings by work-in-production status.

7. The system of claim 6, wherein the programming further includes instructions capable of (1) sorting and displaying the property data records to display, simultaneously, on a single display screen, first and second user-selectable fields corresponding to the digital images of the move-out report and the visual tour data, respectively.

8. The system of claim 1, wherein the property management system further comprises an amenities inspection engine;

wherein the amenities inspection engine comprises a front-end module to receive user data inputs related to amenities of the units and a back-end module for processing the data inputs to alter the unit rental prices for the dwelling units corresponding to the data inputs; and an amenities database having a plurality of amenity identifiers and amenity values associated with the amenity identifiers;

wherein the front-end module includes programming capable of performing the following steps for a selected one of the units:

a. displaying at least one of existing amenities indicia and missing amenities indicia corresponding to the amenity identifiers and the amenity values;

b. in response to user selection of an add-amenities field, displaying a user-selectable list of available amenities;

c. receiving user input corresponding to one or more selections from the list of available amenities;

d. generating an added amenities listing corresponding to the user input;

e. associating digital images with the added amenities listing; and wherein the back-end module includes programming capable of performing the following steps for the selected one of the units:

a. determining an added amenity value corresponding to the added amenities listing;

b. generating an adjusted unit rental price for the selected unit as a function of the added amenity value; and c. updating the property data record to include the adjusted unit rental price.

9. The system of claim 1, wherein the programming further includes executable instructions capable of displaying indicia in the form of a dashboard on a user-perceptible screen, the dashboard comprising a production schedule, the production schedule displayed with user-selectable production schedule fields, the production schedule having associated programming for selectively determining, for multiple units of at least one of the multi-unit dwellings, a first set of the residential units comprising vacant units being turned over to become rent-ready, a second set of the residential units comprising units under renovation, and a third set of the units comprising rent-ready units;

wherein the associated programming is operable to cause indicia corresponding to the first, second, and third sets of the residential units to be displayed in respective ones of the user-selectable production schedule fields; and wherein the associated programming is operable to cause the system to determine delay values corresponding to days elapsed between a move-out date associated with the vacant units and a subsequent date, the subsequent date selected from the group consisting of at least one of the following: the current date, the date of completed renovation, and the rent-ready date.

10. The system of claim 9, wherein the associated programming of the production schedule further includes instructions capable of determining, for the multiple residential units, tenants of the residential units for whom notices have been generated by the property management system.

11. The system of claim 9, wherein the associated programming of the production schedule comprises instructions capable of determining the total members of each of the respective first, second, and third sets of the residential units and displaying numerical values corresponding to the respective members of the respective sets of the units, and enabling display of indicia identifying each of the residential units of the respective first, second, and third sets of residential units, in response to corresponding user input.

12. The system of claim 11, wherein the associated programming of the production schedule comprises instructions capable of determining production statistics by at least one time period for at least one of the multi-unit dwellings of the plurality of multi-unit dwellings, the production statistics comprising, for the time period, a total-unit turnover number corresponding to the number of units of the multi-unit dwelling turned over from vacant to rent-ready, an average number of days associated with the total-unit turnover number, a total-unit renovation number corresponding to the number of units renovated to become rent-ready, and an average number of days associated with the total-unit renovation number.

13. The system of claim 12, wherein the user-selectable fields of the production schedule include a first user-selectable field corresponding to the production statistics and additional, user-selectable fields corresponding to the vacant units, the units under renovation, and the rent-ready units of the first, second, and third sets of the multiple units, respectively, and wherein the associated programming of the production schedule comprises instructions capable of displaying the first, user-selectable field and the additional user-selectable fields simultaneously on the dashboard.

14. The system of claim 13, wherein the associated programming of the production schedule is operable, in response to user selection of one of the additional, user-selectable fields, to display indicia corresponding to the first, second, and third sets of the residential units identifying each of the residential units of the corresponding sets.

15. The system of claim 14, wherein the associated programming of the production schedule is operable, in response to user selection of the additional user-selectable field corresponding to the units under renovation, to display renovation indicia to identify a subset of the units under renovation associated with a time delay exceeding a predetermined amount of time measured from the date of the user selection, whereby the renovation indicia identify the subset of the units under renovation as being in a red zone.

16. The system of claim 12, wherein the associated programming of the production schedule is operable to perform the following steps:

determining the production statistics for a plurality of time periods corresponding to respective, calendar months, the time periods comprising at least the six months preceding a current date of operation of the system; and displaying the production statistics for the plurality of time periods on a single, user-perceptible screen with user-selectable unit-totals fields, the unit-totals fields corresponding to the total-unit turnover number and the total-unit renovation number for respective ones of the time periods; the associated programming further capable of displaying, in response to user-selection of the unit-totals fields, indicia of the units corresponding to at least one of the total-unit turnover number and the total-unit renovation number.

17. The system of claim 9, wherein the programming capable of displaying indicia in the form of a dashboard includes certifications/contracts programming for displaying indicia corresponding to certifications/contracts data previously processed by at least one of the certificates subsystem and the contracts subsystem, the certifications/contracts data being displayed corresponding to active, expired, and soon-to-expire certifications and contracts, the certifications/contracts data displayed including corresponding user-selectable fields and programming capable of displaying, in response to user selection, corresponding lists of the multi-unit dwellings associated with the active, expired, and soon-to-be-expired certifications and contracts, wherein the dashboard programming displays the certifications/contracts data simultaneously with the production schedule.

18. The system of claim 9, wherein the associated programming comprises instructions capable of determining, when executed, at least a fifth set of the residential units comprising units with delay values exceeding at least one predetermined delay amount.

19. The system of claim 18, comprising at least two of the predetermined delay amounts, the two predetermined delay amounts consisting of greater than seven days and greater than fourteen days, respectively, and wherein the associated programming includes instructions for determining a fifth set of the units corresponding to the delay amount of greater than seven days and programming for determining a sixth set of the units corresponding to the delay amount of greater than fourteen days, the instructions further causing the system to display user-selectable, user-perceptible indicia corresponding to the total number of members comprising the fifth and sixth sets of the residential units, respectively; and, in response to user selection of a respective one of the user-selectable indicia, displaying identifying indicia corresponding to the units that are the members of the fifth and sixth sets, respectively.

20. The system of claim 9, further comprising a front-end comprising programming which, when executed, is capable of updating the property data records of the relational database, the front-end programming comprising modules in communication with the relational database and programming to selectively upload user-inputted data to update the property data records via a personal electronic device, the modules comprising a move-out module, a make-ready module, an amenities walkthrough module, a visual tour module, a smartboard module, a credit-card mileage module, and a snow log module.

21. The system of claim 20, wherein the front-end module further comprises a stale apartment module, an incident report module, an audit module, and a preventative maintenance module.

22. The system of claim 20, wherein the visual tour module includes executable instructions capable of receiving user-input corresponding to a video data file of a selected one of the multiple unit dwellings and a selected one of the units in the selected multiple unit dwellings.

23. The system of claim 9, wherein the programming associated with the production schedule includes instructions capable of displaying a user-selectable smartboard field, and further including associated instructions for displaying a smartboard in response to user-selection of the smartboard field, wherein the programming further includes instructions for displaying user-selectable smartboard indicia on the smartboard corresponding to the first, second, and third sets of the residential units determined by the programming and associated with the production schedule.

24. The system of claim 23, wherein the programming associated with the production schedule includes instructions, when executed in response to user selection, for:
   a. determining an average number of days from turnover to rent-ready for the multiple units of the plurality of multi-unit dwellings for a selected time period; and
   b. displaying the average number of days determined in step (a) above as a bar graph on the dashboard with each of the bars corresponding to respective ones of the multi-unit dwellings, the bars arranged in an order of ascending or descending number of days corresponding to the respective multi-unit dwellings.

25. The system of claim 24, wherein the selected period of time comprises one of the plurality of proceeding months.

26. The system of claim 23, wherein the programming further includes instructions, when executed in response to user selection, for:
   a. searching the relational database to determine which of the property data records have been subject to user update during a selected period of time; and
   b. sorting the determined records by type of user update, the user updates associated with operations of the subsystems of the property management system, the user updates comprising a move-out inspection, a make-ready inspection, and a creation of a visual tour; and
   c. displaying activity log indicia corresponding to the sorted user updates, the activity log indicia corresponding to the user associated with the user update, the nature of the user update corresponding to the subsystem operated by the user during the user update, and the date of the user update.

27. The system of claim 1, further comprising an accounting function program module operatively connected to the system, wherein the property data records include lease information, the lease information including charges associated with respective apartment unit damages, wherein the step of creating a move-out report includes executing instructions for:
   a. calculating damages to the selected unit and generating, in displayable and printable form, the move-out report, including indicia corresponding to the apartment unit damages;
   b. generating an electronic notification to the community manager of the selected unit, the notification including the damages to the selected unit, wherein the electronic notification includes a user-selectable link to programming for receiving input from the community manager corresponding to a dollar assessment of the damages to the selected unit;
   c. measuring time elapsed from the generation of the electronic notification to the community manager of the selected unit; and
   d. upon lapse of at least one day, transmitting to the accounting function module the data corresponding to the charges associated with the respective apartment unit damages accessed from the lease information of the property data records, wherein the data correspond to a standardized charge for the corresponding apartment unit damages.

28. The system of claim 1, further comprising a stale apartment subsystem comprising programming to improve the computerized system operations for managing unrented units remaining available beyond at least one predetermined time period measured from a current date;
   wherein the occupancy status identifiers of the property data records include a rent-ready identifier for respective ones of the residential units available for rent, the system having user-category identifiers for users of the system, the user-category identifiers including a maintenance-user identifier for a maintenance-user, the system having programming to update a property data record of a selected unit to the rent-ready occupancy status indicator and to record a date associated with the foregoing update of the selected unit to the rent-ready status;
   wherein the system having programming for associating the user-category identifiers with predetermined ones of the respective users of the system;
   wherein the stale apartment programming comprises instructions, when executed, for performing the following:
      associating the maintenance users with a first predetermined time period;
      in response to input of the maintenance-user to launch the stale apartment subsystem, determining a first stale apartment set having units exceeding the first predetermined time period;
      displaying the first stale apartment set as a first, stale apartment listing having user-selectable indicia identifying the respective units of the set;
      receiving a maintenance-user selection input corresponding to one of the units of the first stale apartment set selected by the maintenance-user;
      in response to receiving the maintenance-user selection input, displaying a first, stale apartment checklist having maintenance-user, input fields for receiving maintenance-user inputs, the first stale apartment checklist having programming to display subfields for additional maintenance-user inputs in response to receiving predetermined maintenance-user inputs in the maintenance-user input fields of the checklist;
      upon maintenance-user input corresponding to completion of the first, stale apartment checklist:
         (a) storing the maintenance-user inputs into the database; and
         (b) transmitting an electronic notification to at least one community manager user of the system and a regional manager user of the system.

29. The system of claim 28, wherein the user-category identifiers include a community manager identifier for the community manager, and further comprising at least two, predetermined time periods measured from the current date;
  wherein the stale apartment programming further comprises instructions, when executed, for preforming the following:
    associating the manager-user with a second predetermined time period greater than the first predetermined time period;
    in response to manager-user input to launch the stale apartment subsystem,
    determining a second stale apartment set having units exceeding the second predetermined time period;
    displaying the second stale apartment set as a second, stale apartment list having user-selectable indicia identifying the respective units of the second stale apartment set;
    receiving a manager-user selection input corresponding to a manager-selected one of the units of the second stale apartment set;
    in response to receiving the manager-user selection input, displaying a second, stale non-identical to the maintenance-user input fields of the first, stale apartment checklist to receive manager-user inputs unique to the manager-user;
    upon user input corresponding to competition of the manager-user checklist:
      (a) storing the manager-user inputs in the relational database; and
      (b) transmitting a corresponding electronic notification to the regional manager.

30. The system of claim 29 wherein, in response to the step of receiving the manager-user selection input for the selected unit of the second stale apartment list, displaying the maintenance-user inputs previously inputted into the first, stale apartment checklist for the selected unit.

* * * * *